US011955744B2

(12) United States Patent
Bednarski et al.

(10) Patent No.: US 11,955,744 B2
(45) Date of Patent: Apr. 9, 2024

(54) STACKABLE DEFORMABLE ELECTRICAL CONNECTOR SYSTEM

(71) Applicant: EVERLAST CLIMBING INDUSTRIES, INC., Minneapolis, MN (US)

(72) Inventors: Vwodek Bednarski, Arvada, CO (US); Christian Stockinger, Loveland, CO (US)

(73) Assignee: Everlast Climbing Industries, Inc., Minneapolis, MN (US)

(*) Notice: Subject to any disclaimer, the term of this patent is extended or adjusted under 35 U.S.C. 154(b) by 741 days.

(21) Appl. No.: 17/015,538

(22) Filed: Sep. 9, 2020

(65) Prior Publication Data

US 2021/0075152 A1 Mar. 11, 2021

Related U.S. Application Data

(60) Provisional application No. 62/897,837, filed on Sep. 9, 2019.

(51) Int. Cl.

| | |
|---|---|
| ***H01R 13/20*** | (2006.01) |
| *A63B 69/12* | (2006.01) |
| *A63B 71/06* | (2006.01) |

(52) U.S. Cl.

CPC .............. *H01R 13/20* (2013.01); *A63B 69/12* (2013.01); *A63B 71/0686* (2013.01)

(58) Field of Classification Search

None

See application file for complete search history.

(56) References Cited

U.S. PATENT DOCUMENTS

| | | | | | |
|---|---|---|---|---|---|
| 1,957,773 | A * | 5/1934 | Good | H01R 13/193 | 439/269.2 |
| 2,099,986 | A * | 11/1937 | Muller | H01R 13/08 | 439/269.2 |
| 2,292,554 | A * | 8/1942 | Weeber | H01R 13/08 | 439/600 |
| 2,390,852 | A * | 12/1945 | Stee | H01R 13/08 | 439/269.2 |
| 2,775,744 | A * | 12/1956 | Henneman | H01R 13/193 | 439/269.2 |
| 2,850,711 | A * | 9/1958 | Terlinde | H01R 13/193 | 439/269.2 |
| 4,886,469 | A * | 12/1989 | Jseng | H01R 13/62 | 439/269.2 |

(Continued)

*Primary Examiner* — Ross N Gushi

(74) *Attorney, Agent, or Firm* — McAndrews, Held & Malloy, Ltd.

(57) ABSTRACT

Various embodiments provide a stackable deformable electrical connector system including a plug body and a connector body each having at least one of studs and jacks with angled and/or misaligned axes. A deformation of one or more of a plug body, studs, jacks, and a connector body or another stackable connector is created when plugging together the angled studs and jacks. The deformation creates resultant forces between the studs and jacks for electrical contact. The connectors may integrate deformable bars in the connector body, locking features and features to ensure polarity. The studs and jacks may be solid metal corrosive-resistant parts, such as titanium, Hastelloy, or Inconel.

24 Claims, 11 Drawing Sheets

(56) References Cited

U.S. PATENT DOCUMENTS

| | | | | | |
|---|---|---|---|---|---|
| 5,145,393 | A * | 9/1992 | Schoon | H01R 13/443 | |
| | | | | 439/269.2 | |
| 5,664,958 | A * | 9/1997 | Chadwick | H01R 13/193 | |
| | | | | 439/651 | |
| 5,919,066 | A * | 7/1999 | Harting | H01R 13/111 | |
| | | | | 439/825 | |
| 2018/0166823 | A1 * | 6/2018 | Stockinger | H01R 13/08 | |

* cited by examiner

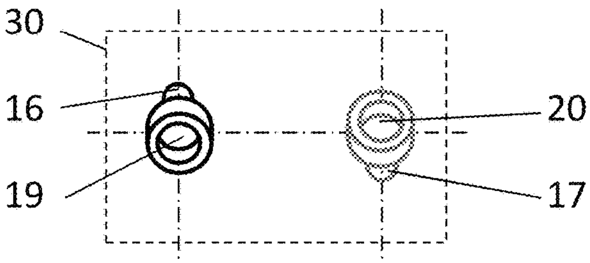
FIG. 3
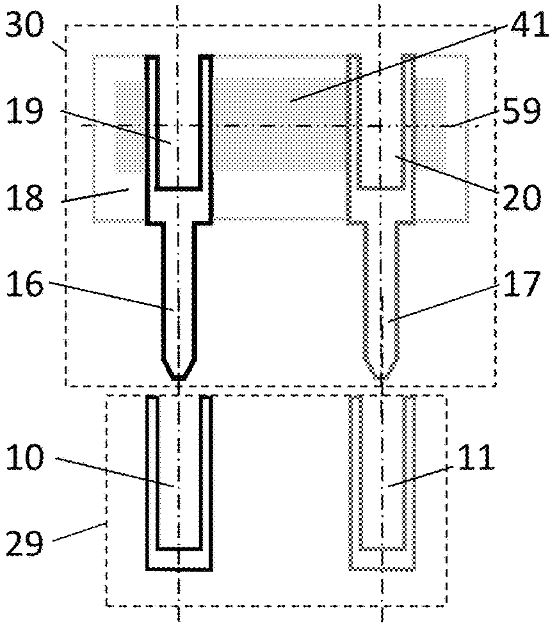
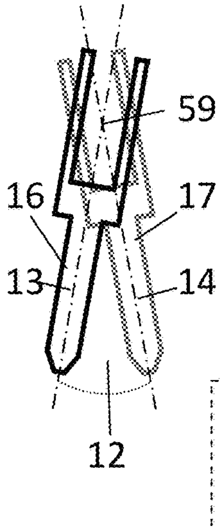
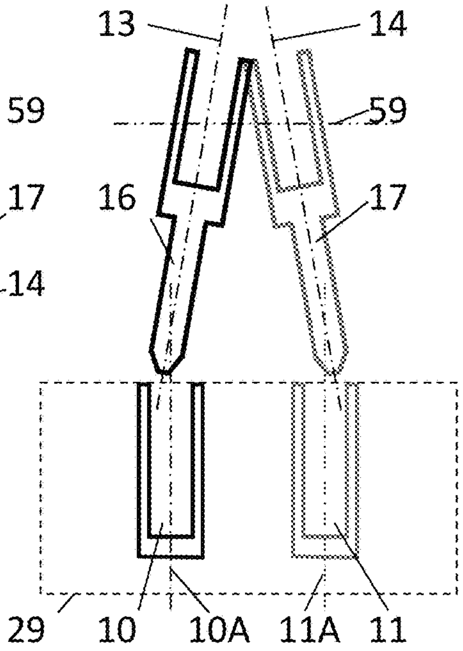
FIG. 4A FIG. 4B FIG. 4C
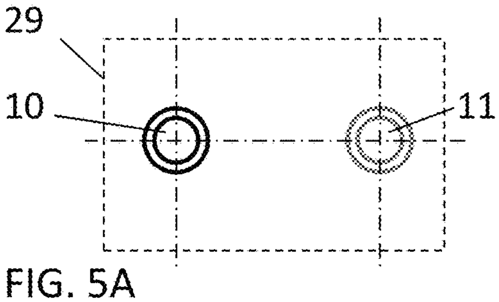
FIG. 5A
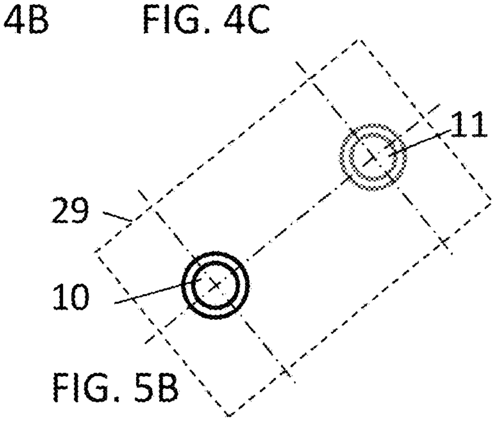
FIG. 5B

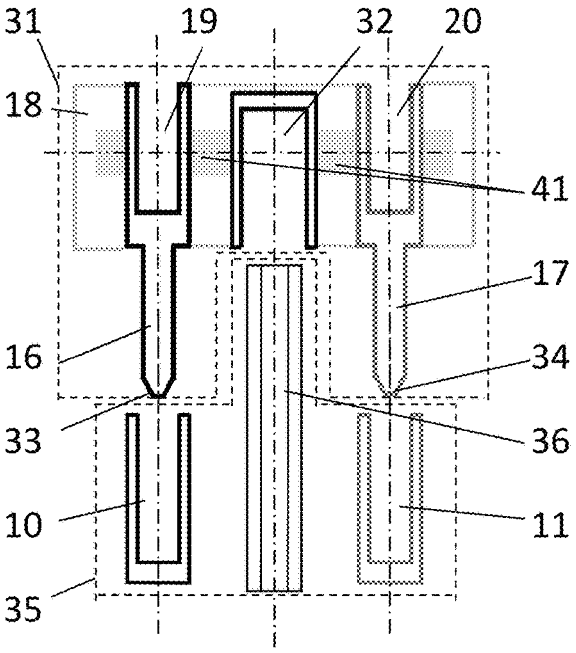
FIG. 12
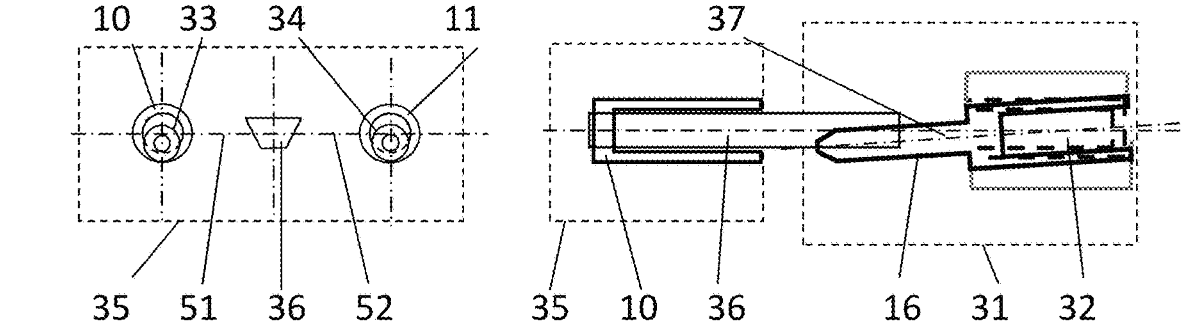
FIG. 13A
FIG. 13B

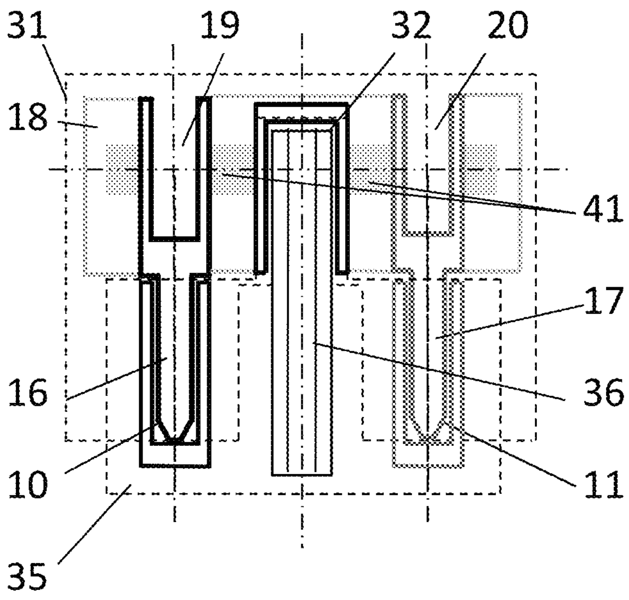
FIG. 14
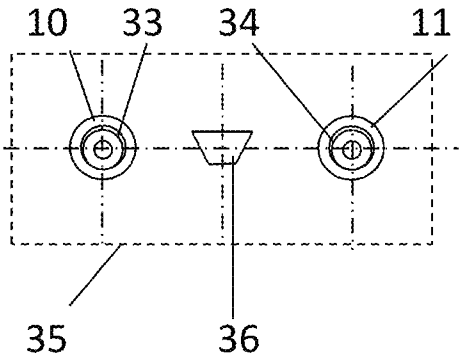
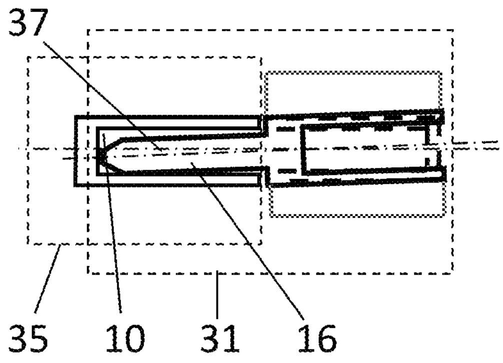
FIG. 15A
FIG. 15B

STACKABLE DEFORMABLE ELECTRICAL CONNECTOR SYSTEM

CROSS-REFERENCE TO RELATED PATENTS INCORPORATED BY REFERENCE

The present application claims priority under 35 U.S.C. § 119(e) to U.S. Provisional Patent Application No. 62/897,837, filed Sep. 9, 2019, entitled "STACKABLE ELECTRICAL DEFORMABLE CONNECTOR SYSTEM WITH STUDS AND JACKS OF CONSTANT WIDTH." The above referenced provisional application is hereby incorporated herein by reference in its entirety.

U.S. Pat. No. 8,602,815, entitled "SWIMMING POOL DECKPLATE FOR HORIZONTAL SURFACES WITH INTEGRATED SLOPES AROUND ELECTRICAL CONTACTS," issued to Stockinger et al. on Dec. 10, 2013, is incorporated by reference herein in its entirety.

U.S. Pat. No. 10,038,274, entitled "DEFORMABLE ELECTRICAL CONNECTOR SYSTEM," issued to Stockinger et al. on Jul. 31, 2018, is incorporated by reference herein in its entirety.

U.S. Pat. No. 10,038,275, entitled "STACKABLE DEFORMABLE ELECTRICAL CONNECTOR SYSTEM," issued to Stockinger et al. on Jul. 31, 2018, is incorporated by reference herein in its entirety.

FIELD

Certain embodiments relate to electrical connectors. More specifically, certain embodiments relate to an electrical connector system having deformable electrical connectors comprising studs and jacks that can be deformed during the plug in process due to angular and/or axial misalignment. Certain embodiments may be stackable onto each other. The electrical connectors may be implemented, for example, in an electronic system installed in a corrosive environment (for example near a pool) and configured to provide timing and scoring of aquatic sports.

BACKGROUND

Existing electronic timing and scoring systems installed at a pool acquire times and scores of athletes using various timing and scoring components, such as touch pads, buttons, relay judging platforms, speakers, lights, judging terminals, and the like. These timing and scoring components are connected to an electronic control device through mechanisms such as connection hubs or cable harnesses to form the electronic timing and scoring system.

Typically, connector hubs and/or cable harnesses are situated on a pool deck and provide mating connections to connectors of the timing and scoring components. The connector hubs and harnesses are often repeatedly splashed with pool water due to being positioned in close proximity to a pool. Pool water contains aggressive chemicals such as chlorine, bromine, and other chemicals that are corrosive to materials, such as metals, that are used in electrical connectors. The corrosive effect of the pool water can be intensified by electrolysis when the pool water sits in a puddle on hubs or harnesses creating a bridge between the electrical connectors of one or several mating connections. Specifically, the signal voltage for the connected devices (typically 3.3 VDC or 5 VDC) creates a potential difference between the electrical contacts, which creates an electrolytic current through the slightly conductive water bridge between the electrical connectors. The electrolysis leads to faster corrosion of the electrical contacts.

In addition to gradually destructing the materials of the electrical connection, corrosion reduces a signal to noise ratio of the connection because the corroded electrical contacts add to the serial resistance in the signal path. Consequently, a signal may become unreadable by the control device in cases of strong corrosion such that the electrical contacts may need cleaning or replacement to resume operation. Frequent cleaning of the electrical contacts to counteract corrosion and maintain clean, well conducting surfaces, however, may render the long-term effect of corrosion worse by abrading protective layers of the electrical contacts.

U.S. Pat. No. 8,602,815, entitled "Swimming Pool Deckplate for Horizontal Surfaces with Integrated Slopes around Electrical Contacts," issued to Stockinger et al. on Dec. 10, 2013, which is incorporated by reference herein in its entirety, describes embodiments of connection hubs having a profile that allows water to flow off to reduce the effects of corrosion. Existing systems have used "banana plugs" to provide a large and robust connector system that can withstand some corrosion. Typically, the banana plugs include two terminals at a distance of 0.75 inch and are provided by the timing components. The connection hubs and harnesses provide the mating banana jacks. For example, a connection hub may provide connection jacks for push buttons, a touch pad, a start input, a relay judging platform signal, a start signal output for a visual start signal, and a speaker output. A cable harness may provide connection jacks for a touch pad input and a button input for each lane and a start input.

The male counterparts of the connectors are usually built as a metal stud having a spring member integrated around the stud to make durable, secure electrical contact within the female jack. The studs are typically steel or brass, with nickel and tin or gold plating, which are susceptible to corrosion. The springs are typically beryllium copper alloys with nickel and tin or gold plating. The spring forces urge the male stud into contact with the walls of the female jack when the stud is inserted into the jack. The force provided by the spring compensates for mechanical tolerances and abrasion over time.

Corrosion resistant materials, such as titanium, may have properties similar to stainless steel, which is hard and highly inflexible. For example, titanium is not as flexible as the beryllium copper alloys typically employed to create enduring springs with a large range of spring deflection. Consequently, it may be difficult or undesirable to manufacture traditional spring contacts out of titanium alone.

U.S. Pat. No. 10,038,274, entitled "Deformable Electrical Connector System," and U.S. Pat. No. 10,038,275, entitled "Stackable Deformable Electrical Connector System," both of which issued to Stockinger et al. on Jul. 31, 2018, and each of which is incorporated by reference herein in its entirety, describe embodiments of connectors that exude contact forces due to deformation of the connectors that are caused by a misalignment of the axis of studs and jacks. However, the studs and/or jacks of these connectors may be difficult to manufacture due to the non-constant widths of the studs and/or jacks.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A deformable connector system having electrical connectors that comprise studs and jacks that are angularly and/or axially misaligned, and that, in certain embodiments, can be stacked onto each other is provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 3 is a top view of an exemplary connector having an upper stackable member with two studs and two jacks, in accordance with various embodiments.

FIG. 4A is a front section view of an exemplary connector having an upper stackable member with deformable bar and two studs unplugged from a lower non-stackable member with two jacks, the deformable bar configured to substantially deform by torsion through angular misalignment of the two studs with respect to the two jacks, in accordance with various embodiments.

FIG. 4B is a side section view of an exemplary connector having an upper stackable member with two studs, in accordance with various embodiments.

FIG. 4C is an angled section view of an exemplary connector having an upper stackable member with two studs unplugged from a lower non-stackable member with two jacks, the two studs angularly misaligned with the two jacks to substantially deform a deformable bar by torsion, in accordance with various embodiments.

FIG. 5A is a top view of a lower non-stackable member with two jacks, in accordance with various embodiments.

FIG. 5B is a top view of an angled lower non-stackable member with two jacks, in accordance with various embodiments.

FIG. 12 is a front section view of an exemplary connector having an upper stackable member with two deformable bars, three jacks, and two studs unplugged from a lower non-stackable member with two jacks and one stud, in accordance with various embodiments.

FIG. 13A is a top view of a lower non-stackable member with two round jacks, one trapezoidal stud and showing the misaligned tips of the studs of an upper member, in accordance with various embodiments.

FIG. 13B is a side section view of an exemplary connector having an upper stackable member with jack and stud not plugged into a lower non-stackable member with jack and stud, in accordance with various embodiments.

FIG. 14 is a front section view of an exemplary connector having an upper stackable member with two deformable bars, three jacks, and two studs fully plugged into a lower non-stackable member with two jacks and one stud, in accordance with various embodiments.

FIG. 15A is a top section view of a lower non-stackable member with two round jacks, one trapezoidal stud and showing the tips of the studs of an upper member, in accordance with various embodiments.

FIG. 15B is a side section view of an exemplary connector having an upper stackable member with jack and stud fully plugged into a lower non-stackable member with jack and stud, in accordance with various embodiments.

DETAILED DESCRIPTION

Figure 1:
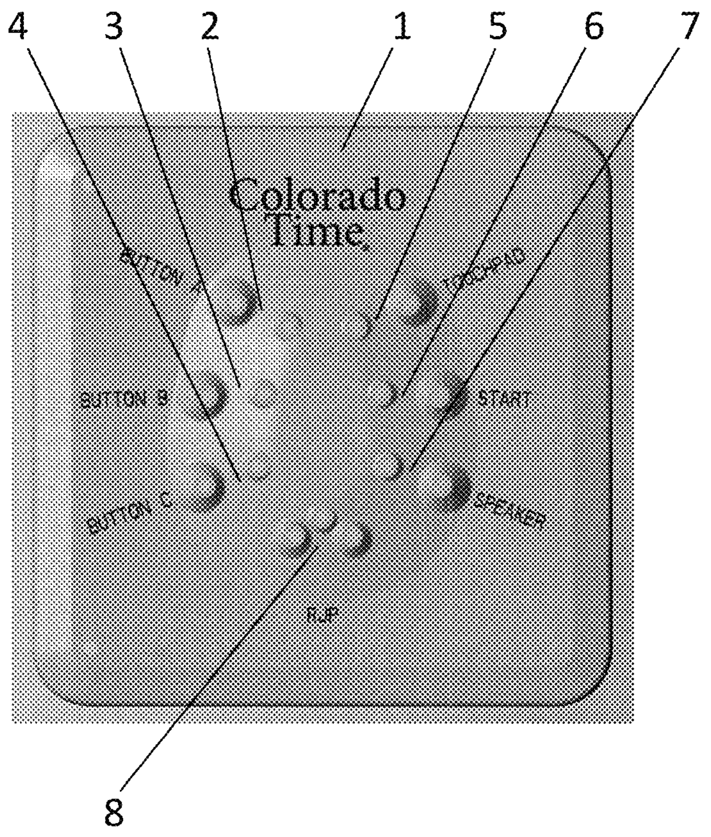
FIG. 1 is a top elevation view of an exemplary connection hub, in accordance with various embodiments.

Certain embodiments may be found in electrical connectors. An example embodiment aids users by providing corrosion resistant plugs and jacks that create resultant forces by deformation of the members such that conventional corroding spring members may be eliminated.

More specifically, aspects of the present disclosure provide an electrical connector system where certain members may be stacked and certain members may not be stacked. The electrical connectors may include studs of a substantially constant thickness and jacks with a substantially constant hole width, referred to herein as studs and jacks that have substantially constant widths. The studs and/or jacks are connected through a bar that may be deformable. In various embodiments, the member may be wrapped in a casing the can be deformable and may contribute to, or entirely provide, the resulting deformation forces without the need of the deformable bar.

In a representative embodiment, the corresponding studs and jacks of the members are arranged with angular and/or axial misalignments to each other. The misalignments cause torsion, compression, and/or tension, and therefore deformation in the bar that connects the jacks and/or studs of the members, when the members are plugged into each other.

Certain embodiments provide torsion forces in the deformable bar due to angular misalignments of the studs with respect to jacks, the studs arranged out of the plane of the jack axes and the axis of the deformable bar. Certain embodiments provide bending and compression forces in the deformable bar due to angular misalignments of the studs with respect to jacks, the studs arranged in-plane of the jack axes and the axis of the deformable bar. Certain embodiments provide bending and tension forces in the deformable bar due to angular misalignments of the studs with respect to jacks, the studs arranged in-plane of the jack axes and the axis of the deformable bar.

In an exemplary embodiment, cones may be provided on tips of the studs and/or chamfers at the entry of the jacks to guide the studs into the jacks during the initial plug-in process. The deformable bar may experience forces and deformation at a contact point formed between one stud and its corresponding jack during the initial guiding process.

In certain embodiments, two contact points may form further in the plug in process between one stud and its corresponding jack due to the substantially constant widths of the studs and jacks. The substantially rigid studs and jacks may transfer the contact forces into the deformable bar(s) connecting the studs and/or the jacks.

In various embodiments, the out-of-plane angular misalignments, the in-plane angular misalignments, and/or the axial misalignments may be added in any combination to create the corresponding deformation forces in the deformable bars. The deformation forces are exuded through the contact points of corresponding studs and jacks, and the contact points may be used for electrical contact between the plugged in members.

Various embodiments provide a connector system comprising a stackable upper member 24, 30 and a lower non-stackable member 29 or a lower stackable member 30. The stackable upper member 24, 30 may comprise an upper member body 18 holding upper connections comprising at least one of a plurality of studs 16, 17, 36 and a plurality of jacks 10, 11, 32. A lower non-stackable member 29 may comprise a lower member body holding lower connections comprising at least one of the plurality of studs 16, 17, 36 and the plurality of jacks 10, 11, 32 that are opposite and correspond with the upper connections. A lower stackable member 30 may comprise an upper member body 18 holding upper connections comprising at least one of a plurality of studs 16, 17, 36 and a plurality of jacks 10, 11, 32 that are opposite and correspond with the upper connections. The upper connections and the lower connections have angled and/or misaligned axes 13, 14, 10A, 11A in an unplugged state. The misalignment creates deformation (see FIGS. 6C, 7C, 8B, 8C, 8D, 9B, 9C, 9D, 10, 15B, 19B, 19C, 21A, 21B) of at least one of the upper stackable member 24, 30 and a lower non-stackable member 29 or in a lower stackable member 30 when the upper connections and the lower connections are plugged together. The torsion deformation creates a resultant force between the upper connections and the lower connections.

Unless so claimed, the present disclosure is not limited to a particular direction of the angling of the axes. For example, various embodiments of stackable connectors with two studs and two jacks may provide an angle of the axes that are positive clockwise while other embodiments may provide angles of the axes that are positive counter-clockwise.

As used herein, the terms "exemplary" or "example" mean serving as a non-limiting example, instance, or illustration. As used herein, the term "e.g." introduces a list of one or more non-limiting examples, instances, or illustrations.

As used herein, an element recited in the singular and proceeded with the word "a" or "an" should be understood as not excluding plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

FIG. 1 is a top elevation view of an exemplary connection hub 1, in accordance with various embodiments. Referring to FIG. 1, the connection hub 1 comprises a connection 2 for button A, a connection 3 for button B, a connection 4 for button C, a connection 5 for a touch pad, a connection 6 for a start device, a connection 7 for a speaker, and a combined connection 8 for a relay judging platform (RJP) with a speed light. Connections 2-7 may be, for example, two-pronged connections. Connection 8 may be a three-pronged connection or any suitable connection. Connections 2-8 may be considered non-stackable.

Figure 2:
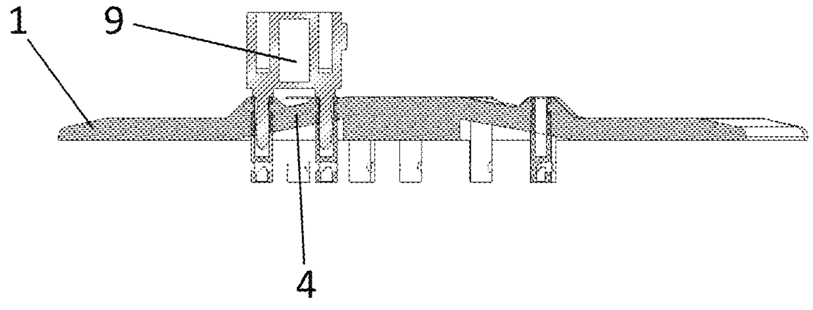
FIG. 2 is a side section view of an exemplary plug inserted into a connection hub, in accordance with various embodiments.

FIG. 2 is a side section view of an exemplary plug 9 inserted into a connection hub 1, in accordance with various embodiments. Referring to FIG. 2, a plug 9 connected to a timing component, such as a button, is inserted in a jack 4 of connection hub 1 corresponding with button C.

FIG. 3 is a top view of an exemplary connector having an upper stackable member 30 with two studs 16, 17 and two jacks 19, 20. A plug body, deformable bar, and cable, for example, are not shown.

Figure 11:
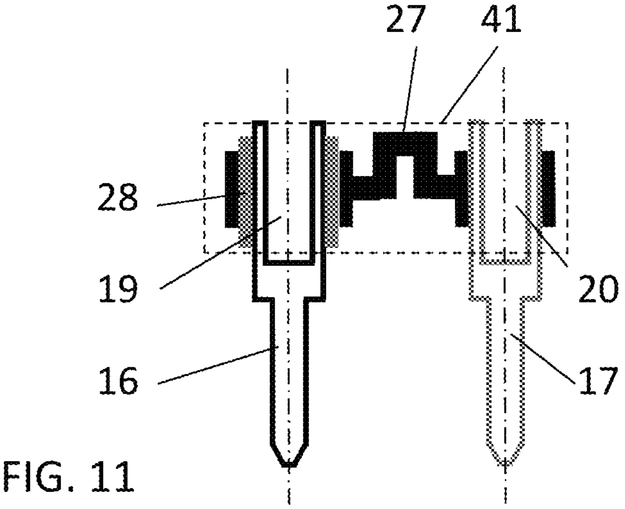
FIG. 11 is a front section view of an exemplary stackable member with two studs and two jacks connected with a deformable bar, in accordance with various embodiments.

FIG. 4A is a front section view of an exemplary connector having an upper stackable member 30 with deformable bar 41 and two studs 16, 17 unplugged from a lower non-stackable member 29 with two jacks 10, 11, the deformable bar 41 configured to substantially deform by torsion through angular misalignment of the two studs 16, 17 with respect to the two jacks 10, 11, in accordance with various embodiments. Referring to FIG. 4A, the connector system comprises an upper stackable member 30 and a lower non-stackable member 29. The upper stackable member 30, which may share various characteristics with the plug 9 of FIG. 2, comprises a plug body 18, studs 16, 17, and jacks 19, 20. The connecting wires are not shown for clarity. For the upper connector 30, stud 16 and jack 19 are provided on top of each other as are stud 17 and jack 20. The studs 16, 17 and jacks 19, 20 that are provided on top of each other are galvanically connected in this exemplary embodiment. In other embodiments, the studs 16, 17 and jacks 19, 20 may not be galvanically connected. The plug body 18 may be a plastic compound or any suitable material. In certain embodiments, a deformable bar 41 with an axis 59 may be included with the plug body 18 to provide substantial torsion deformation forces, other deformation and torsion forces being provided by some or all of the other parts of the connector 30. Deformable bar 41 may be made of various suitable materials, electrically conducting or not conducting. In various embodiments, one of the stud/jack combinations may be insulated with a suitable material if the deformable bar material is electrically conducting to allow electrical signals to be transferred by the connector as shown in FIG. 11.

FIG. 4B is a side section view of an exemplary connector having an upper stackable member with two studs 16, 17, in accordance with various embodiments. Referring to FIG. 4B, the axes 13, 14 of the two studs 16, 17 may each be out of the plane of the jack axes and the axis 59 of the deformable bar 41, which in this view appears as a point. The axes 13, 14 of the two studs 16, 17 form an angle 12 with respect to each other. In various embodiments, the angle 12 may be changed when the upper member 30 is inserted into a lower member, providing torsion forces in the deformable bar 41.

FIG. 4C is an angled section view of an exemplary connector having an upper stackable member with two studs 16, 17 unplugged from a lower non-stackable member 29 with two jacks 10, 11, the two studs 16, 17 angularly misaligned with the two jacks 10, 11 to substantially deform a deformable bar by torsion, in accordance with various embodiments. FIG. 4C is an image is an angled section view of the two studs 16, 17, with their axes 13, 14 out of the plane of the jack axes 10A, 11A and the axis 59 of the deformable bar 41, and a lower non-stackable member 29 with the two jacks 10, 11, in accordance with various embodiments. The two studs 16, 17 are unplugged from the lower member. The studs 16, 17 extend along axes 13, 14 from the plug body to mate with the jacks 10, 11 of the lower non-stackable member 30 to form a connection. The lower non-stackable member 29, which may share various characteristics with the connection hub 1 of FIGS. 1 and 2, may comprise jacks 10, 11, each having an axis 10A, 11A that is at an angle with the corresponding stud axes 13, 14.

FIG. 5A is a top view of a lower non-stackable member 29 with two jacks 10, 11, in accordance with various embodiments. FIG. 5B is a top view of an angled lower non-stackable member 29 with two jacks 10, 11, in accordance with various embodiments.

Figure 6A:
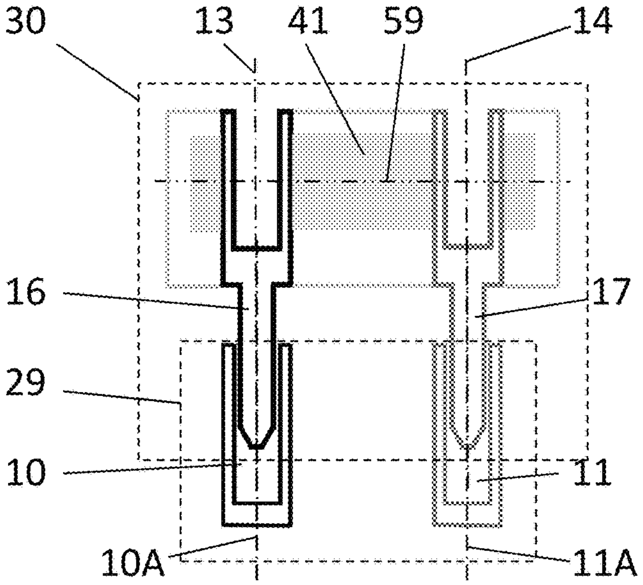
FIG. 6A is a front section view of an exemplary connector having an upper stackable member with a deformable bar and two studs partially plugged into a lower non-stackable member with two jacks, in accordance with various embodiments, in accordance with various embodiments.
Figure 6B:
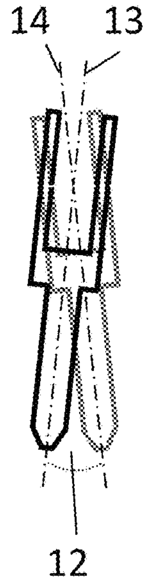
FIG. 6B is a side section view of an exemplary connector having an upper stackable member with two studs, in accordance with various embodiments.
Figure 6C:
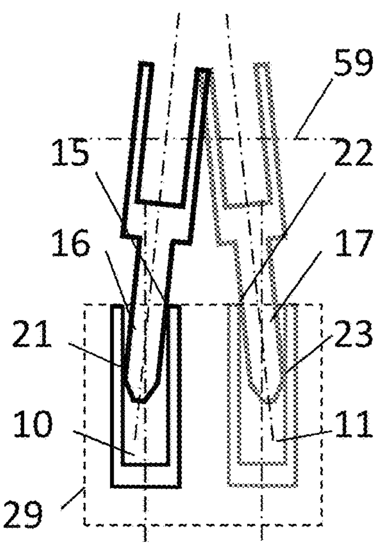
FIG. 6C is an angled section view of an exemplary connector having an upper stackable member with two studs partially plugged into a lower non-stackable member with two jacks, in accordance with various embodiments, in accordance with various embodiments.

FIG. 6A is a front section view of an exemplary connector having an upper stackable member 30 with a deformable bar 41 and two studs partially plugged into a lower non-stackable member 29 with two jacks 10, 11, in accordance with various embodiments. The cable of the upper stackable member 30 is not shown. Referring to FIG. 6A, the deformable bar 41 has an axis 59, studs 16, 17 have axes 13, 14, and jacks 10, 11 have axes 10A, 11A. FIG. 6B is a side section view of an exemplary connector having an upper stackable member with two studs 16, 17, in accordance with various embodiments. The body, deformable bar, and cable of the upper stackable member 30 are not shown. Referring to FIG. 6B, the studs 16, 17 have axes 13, 14 that form an angle 12 that may change as the studs 16, 17 are inserted into corresponding jacks of a lower member. FIG. 6C is an angled section view of an exemplary connector having an upper stackable member with two studs 16, 17 partially plugged into a lower non-stackable member 29 with two jacks 10, 11, in accordance with various embodiments. The body, deformable bar, and cable of the upper stackable member 30 are not shown. Referring to FIG. 6C, when stud 16 is forced into jack 10 of the lower non-stackable member 29, two contact points 15, 21 form such that they exude a momentum on stud 16. The contact points 22, 23 on stud 17 create a counter bearing momentum on stud 17 when stud 17 is forced into jack 11 of the lower non-stackable member 29 because the deformable bar 41 and body 18 are arranged to connect studs 16, 17, transferring the momentum between the studs 16, 17. The momentum creates a torsion deformation in the deformable bar 41. Referring again to FIG. 6B, the angle 12 formed by the two axes 13, 14 may be adapted to be reduced by the torsion deformation in the deformable bar 41 created by contact points 15, 21, 22, 23 in studs 16, 17. In other words, the momentum force created by contact points 15, 21 in jack 10 of the lower member 29 flows into stud 16, through the torsion of the deformable bar 41 to stud 17, reducing the angle 12, and down through the contact points 22, 23 into the jack 11 back into the lower member 29.

Figure 7A:
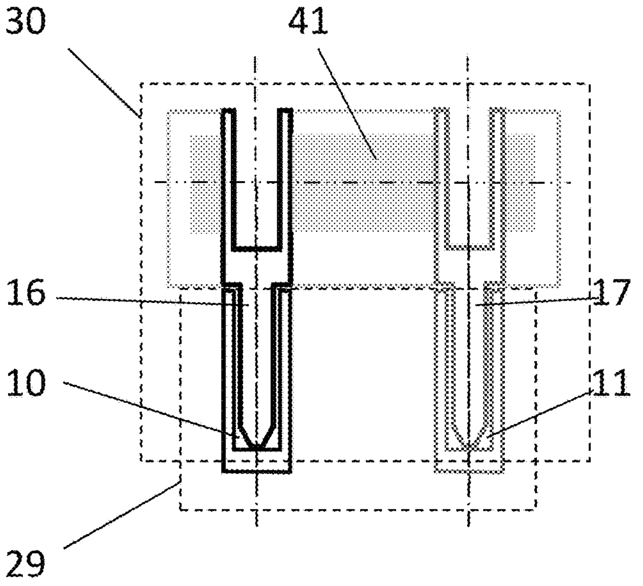
FIG. 7A is a front section view of an exemplary connector having an upper stackable member with deformable bar substantially deforming through torsion and two studs fully plugged into a lower non-stackable member with two jacks, in accordance with various embodiments.
Figure 7B:
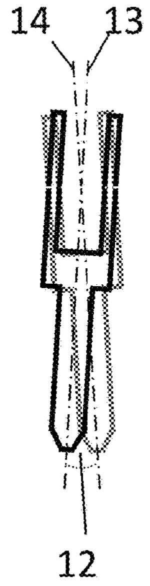
FIG. 7B is a side section view of an exemplary connector having an upper stackable member with two studs, in accordance with various embodiments.
Figure 7C:
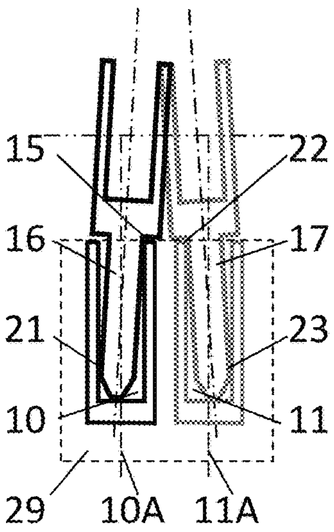
FIG. 7C is an angled section view of an exemplary connector having an upper stackable member with two studs fully plugged into a lower non-stackable member with two jacks, in accordance with various embodiments.

FIG. 7A is a front section view of an exemplary connector having an upper stackable member 30 with deformable bar 41 substantially deforming through torsion and two studs 16, 17 fully plugged into a lower non-stackable member 29 with two jacks 10, 11, in accordance with various embodiments. The cable of the upper stackable member 30 is not shown. FIG. 7B is a side section view of an exemplary connector having an upper stackable member with two studs 16, 17, in accordance with various embodiments. Referring to FIG. 7B, the studs 16, 17 have axes 13, 14 that form an angle 12 that may be a minimum angle once the studs 16, 17 are fully inserted into corresponding jacks of a lower member. FIG. 7C is an angled section view of an exemplary connector having an upper stackable member with two studs 16, 17 fully plugged into a lower non-stackable member 29 with two jacks 10, 11, in accordance with various embodiments. The body, deformable bar, and cable of the upper stackable member 30 are not shown. Referring to FIG. 7C, when stud 16 is forced into jack 10 of the lower non-stackable member 29, two contact points 15, 21 form and exude a momentum on stud 16. The contact points 22, 23 on stud 17 create a counter bearing momentum on stud 17 when stud 17 is forced into jack 11 of the lower non-stackable member 29 because the deformable bar 41 and body 18 are arranged to connect studs 16, 17 and the lower member 29 connects jacks 10, 11. The momentum creates a torsion deformation in the deformable bar 41 that connects the studs 16, 17. Referring again to FIG. 7B, the angle 12 formed by the two axes 13, 14 may be adapted to be reduced to its minimum by the torsion deformation in the deformable bar 41, which is created by contact points 15, 21, 22, 23 in studs 16, 17. The contact points 15, 21, 22, 23 experience contact forces between stud 16 and jack 10 as well as stud 17 and jack 11 that may be utilized for electrical contact between upper member 30 and lower member 29. The electrical contact may be utilized for electrical signals between the members.

Figure 8A:
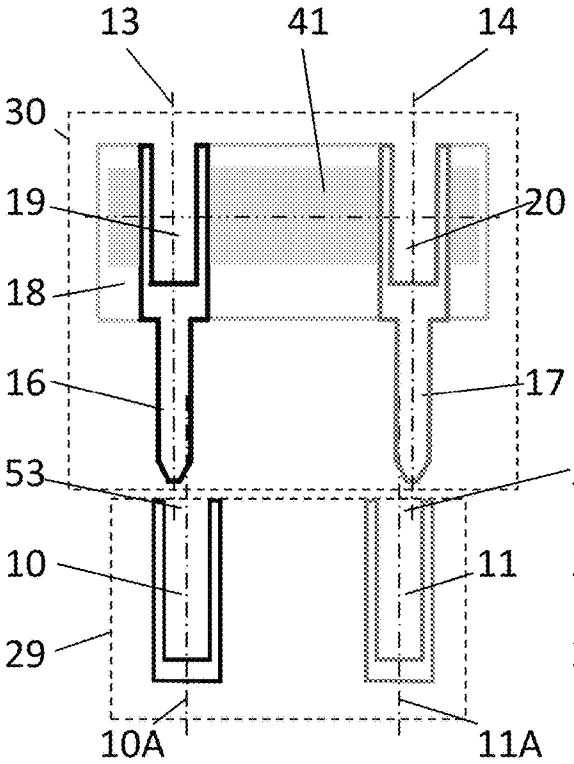
FIG. 8A is a front section view of an exemplary connector having an upper stackable member with deformable bar and two studs unplugged from a lower non-stackable member with two jacks, the two studs axially misaligned with the two jacks, in accordance with various embodiments.

FIG. 8A is a front section view of an exemplary connector having an upper stackable member 30 with deformable bar 41 and two studs 16, 17 unplugged from a lower non-stackable member 29 with two jacks 10, 11, the two studs 16, 17 axially misaligned with the two jacks 10, 11 in accordance with various embodiments. The cable of the upper stackable member 30 is not shown. Referring to FIG. 8A, the axes 13, 14 of studs 16, 17 may be misaligned from axes 10A, 11A of jacks 10, 11 by distances 53, 54.

Figure 8B:
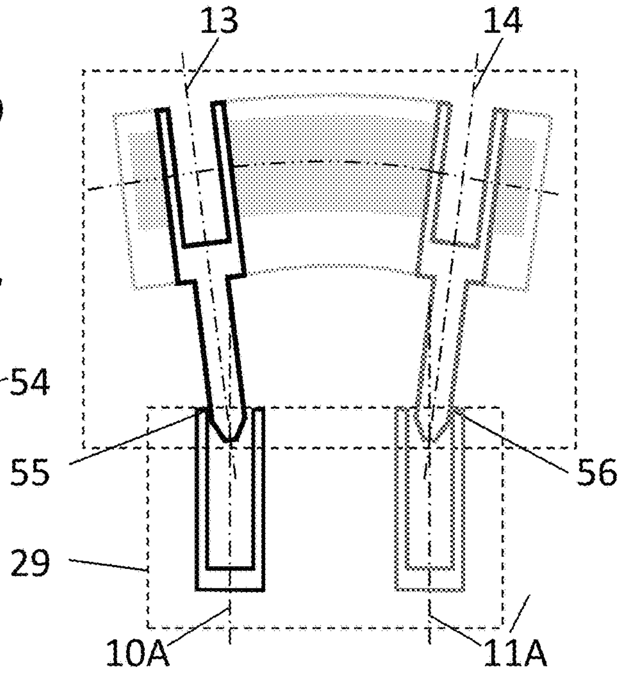
FIGS. 8B and 8C are front section views of an exemplary connector having an upper stackable member with deformable bar and two studs partially plugged into two jacks of a lower non-stackable member, an axial misalignment of the studs with respect to the jacks configured to cause the deformable bar to substantially deform through bending and compression during insertion of the studs into jacks, in accordance with various embodiments.
Figure 8C:
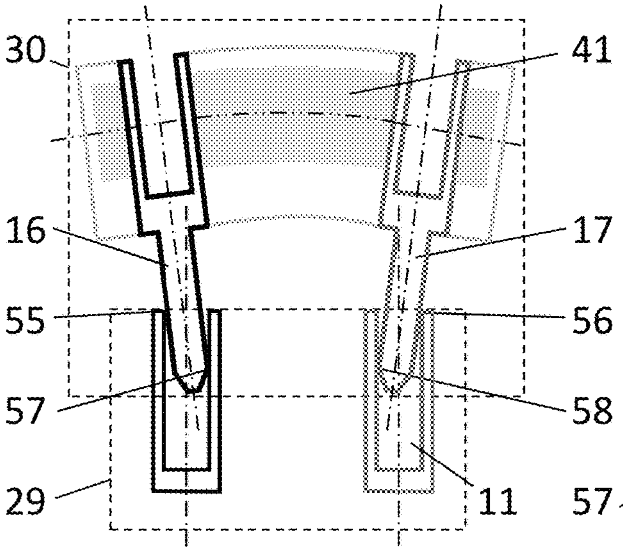

FIGS. 8B and 8C are front section views of an exemplary connector having an upper stackable member 30 with deformable bar 41 and two studs 16, 17 partially plugged into two jacks 10, 11 of a lower non-stackable member 29, an axial misalignment of the studs 16, 17 with respect to the jacks 10, 11 configured to cause the deformable bar 41 to substantially deform through bending and compression during insertion of the studs 16, 17 into jacks 10, 11, in accordance with various embodiments. The cable of the upper stackable member 30 is not shown. Referring to FIG. 8B, when studs 16, 17 are forced into jacks 10, 11, two contact points 55, 56 form and exude a bending force on deformable bar 41. Referring to FIG. 8C, when studs 16, 17 are forced further into jacks 10, 11, additional contact points 57, 58 are formed and create compression forces in the deformable bar 41 that is arranged to connect studs 16, 17.

Figure 8D:
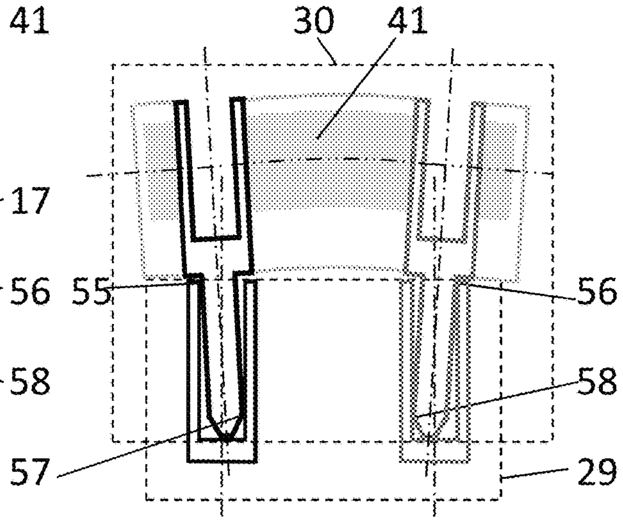
FIG. 8D is a front section view of an exemplary connector having an upper stackable member with deformable bar and two studs fully plugged into two jacks of a lower non-stackable member, in accordance with various embodiments.

FIG. 8D is a front section view of an exemplary connector having an upper stackable member 30 with deformable bar 41 and two studs 16, 17 fully plugged into two jacks 10, 11 of a lower non-stackable member 29, in accordance with various embodiments. The cable of the upper stackable member 30 is not shown. Referring to FIG. 8D, the contact points 55, 56, 57, 58 create compression forces and bending forces, and therefore deformation in the deformable bar 41. The contact points 55, 56, 57, 58 experience contact forces between studs 16, 17 and jacks 10, 11 that may be utilized for electrical contact between upper member 30 and lower member 29. The electrical contact may be utilized for electrical signals between the members.

Figures 9A, 9B, 9C, 9D:
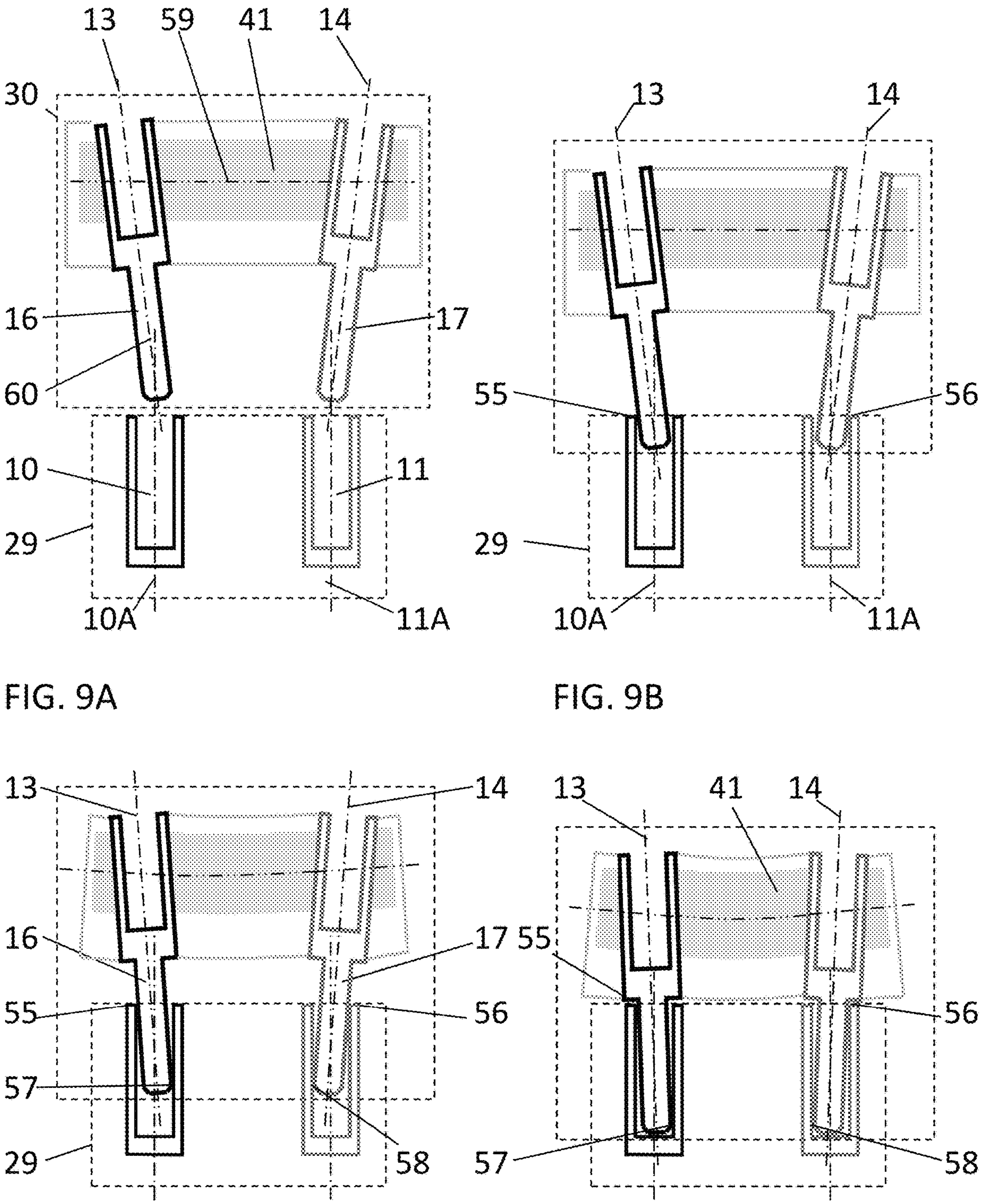
FIG. 9A is a front section view of an exemplary connector having an upper stackable member with deformable bar and two studs unplugged from a lower non-stackable member with two jacks, the two studs angularly misaligned with the two jacks, in accordance with various embodiments.
FIG. 9B is a front section view of an exemplary connector having an upper stackable member with deformable bar and two studs partially plugged into two jacks of a lower non-stackable member creating two contact points, in accordance with various embodiments.
FIG. 9C is a front section view of an exemplary connector having an upper stackable member with deformable bar and two studs partially plugged into two jacks of a lower non-stackable member creating four contact points, an angular misalignment of the studs with respect to the jacks configured to cause the deformable bar to substantially deform through bending and compression during insertion of the studs into jacks, in accordance with various embodiments.
FIG. 9D is a front section view of an exemplary connector having an upper stackable member with deformable bar and two studs fully plugged into two jacks of a lower non-stackable member, in accordance with various embodiments.

FIG. 9A is a front section view of an exemplary connector having an upper stackable member 30 with deformable bar 41 and two studs 16, 17 unplugged from a lower non-stackable member 29 with two jacks 10, 11, the two studs 16, 17 angularly misaligned with the two jacks 10, 11, in accordance with various embodiments. The cable of the upper stackable member 30 is not shown. Referring to FIG. 9A, an angular misalignment of angle 60 is formed between the axes 13, 14 of studs 16, 17 and axes 10A, 11A of jacks 10, 11. The angle 60 results from the tips of studs 16, 17 being closer together than the tops of the studs 16, 17.

FIG. 9B is a front section view of an exemplary connector having an upper stackable member 30 with deformable bar 41 and two studs 16, 17 partially plugged into two jacks 10, 11 of a lower non-stackable member 29 creating two contact points 55, 56, in accordance with various embodiments. The cable of the upper stackable member 30 is not shown. Referring to FIG. 9B two contact points 55, 56 may be formed without yet exuding a bending force on deformable bar 41 when studs 16, 17 are forced into jacks 10, 11.

FIG. 9C is a front section view of an exemplary connector having an upper stackable member 30 with deformable bar 41 and two studs 16, 17 partially plugged into two jacks 10, 11 of a lower non-stackable member 29 creating four contact points 55, 56, 57, 58, an angular misalignment of the studs 16, 17 with respect to the jacks 10, 11 configured to cause the deformable bar 41 to substantially deform through bending and compression during insertion of the studs 16, 17 into jacks 10, 11, in accordance with various embodiments. The cable of the upper stackable member 30 is not shown. Referring to FIG. 9C, when studs 16, 17 are forced further into jacks 10, 11, additional contact points 57, 58 are formed and create compression and bending forces in the deformable bar 41 that is arranged to connect studs 16, 17

FIG. 9D is a front section view of an exemplary connector having an upper stackable member 30 with deformable bar

41 and two studs 16, 17 fully plugged into two jacks 10, 11 of a lower non-stackable member 29, in accordance with various embodiments. The cable of the upper stackable member 30 is not shown. Referring to FIG. 9D, the contact points 55, 56, 57, 58 create compression forces and bending forces, and therefore deformation in the deformable bar 41. The contact points 55, 56, 57, 58 experience contact forces between studs 16, 17 and jacks 10, 11 that may be utilized for electrical contact between upper member 30 and lower member 29. The electrical contact may be utilized for electrical signals between the members. If the angling is in the opposite direction, such that the tips of the studs are farther apart than the tops of the studs, the deformation forces may be tension and bending forces instead of the compression and bending forces as described above. Unless so claimed, the present disclosure is not limited to a particular direction of the angle.

Figure 10:
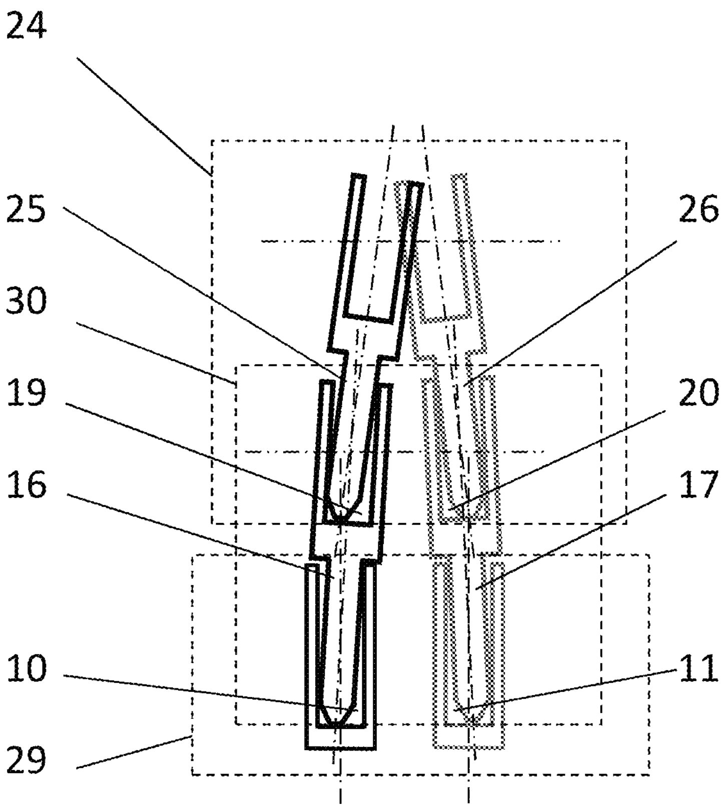
FIG. 10 is an angled section view of exemplary connectors having an upper stackable member with two studs plugged into jacks of a middle stackable member, the middle stackable member having two studs plugged two jacks of a lower non-stackable member, in accordance with various embodiments.

FIG. 10 is an angled section view of exemplary connectors having an upper stackable member 24 with two studs 25, 26 plugged into jacks 19, 20 of a middle stackable member 30, the middle stackable member 30 having two studs 16, 17 plugged two jacks 10, 11 of a lower non-stackable member 29, in accordance with various embodiments. The bodies, deformable bars, and cables of the upper 24 and middle 30 stackable members are not shown. Referring to FIG. 10, the additional stackable connector 24 with its studs 25, 26 is plugged into the jacks 19, 20 of the stackable member 30. The connector 24 and the stackable connector 30 are deformed. The lowest connector 29 is not deformed. The contact forces between stud 25 in jack 19 and stud 26 in jack 20 create substantially similar forces that deform a deformable bar 41 and body 18 arranged between studs 25 and 26 of the additional stackable connector 24. These contact forces may be utilized for electrical contact between stackable member 30 and additional stackable connector 24. The contact forces between stackable member 30 and member 29 may be utilized for electrical contact between member 30 and member 29. In various embodiments, jack 19 and stud 16 as well as stud 17 and jack 20 in upper stackable member 30 may be galvanically connected such that an electrical signal may be distributed through all three members 24, 30 and 29 of the plug assembly.

FIG. 11 is a front section view of an exemplary stackable member with two studs 16, 17 and two jacks 19, 20 connected with a deformable bar 41, in accordance with various embodiments. The body and cable of the upper stackable member is not shown. Referring to FIG. 11, the deformable bar 41 may comprise a deformable spring member 27 and an insulating body 28. The deformable spring member 27 may be made of conducting material, such as metal that can be deformed through torsion, compression, and/or tension. The insulating body 28 may be arranged between the two studs 16, 17 to prevent electrical signal from being shorted. For example, the insulating body 28 may be an insulation ring attached to at least one of the studs 16.

FIG. 12 is a front section view of an exemplary connector having an upper stackable member 31 with two deformable bars 41, three jacks 19, 20, 32, and two studs 16, 17 unplugged from a lower non-stackable member 35 with two jacks 10, 11 and one stud 36, in accordance with various embodiments. The cable of the upper stackable member 31 is not shown. Referring to FIG. 12, the deformable bars 41 may be configured to substantially deform through, torsion due to angular misalignment of the studs 16, 17 of the upper stackable member 31 with respect to the jacks 10, 11 of the lower non-stackable member 35. In various embodiments, the studs 16, 17 of the upper stackable member 31 may be round and jack 32 may be trapezoidal. The two studs 16, 17 and three jacks 19, 20, 32 may be arranged in a body 18. The studs 16, 17 of the upper stackable member 31 may have tips 33, 34. In an exemplary embodiment, two deformable bars 41 may be arranged inside the body 18 of the upper member 31. In various embodiments, the plugs and jacks of the connector embodiment of FIG. 12 may share various characteristics with the jacks of connection hub 1 and/or the studs of plug 9 illustrated in FIGS. 1-2 and the studs 16, 17 of upper stackable member 30 and the jacks 10, 11 of lower non-stackable member 29 illustrated in FIGS. 4A, 4B and 4C, for example.

In certain embodiments, jack 32 may be of a shape that fits with a corresponding stud 36, for example with a trapezoidal cross-section, which fits in one way when the plug is inserted in order to ensure correct polarity when plugged together. Furthermore, any shape of the stud/plug combination that provides for a correct polarity such as trapezoidal, an unsymmetrical triangle, round with notch, and the like may be provided. Additionally and/or alternatively, round stud 16 may have a different diameter from round stud 17 so each stud 16, 17 fits one way into corresponding jacks 10, 11 with corresponding different diameters, thus ensuring correct polarity. As another example, a connector with five studs 16, 17, 36 and jacks 10, 11, 32 may have four studs 16, 17, 36 and one jack 10, 11, 32 on an upper member 30 and the corresponding four jacks 10, 11, 32 and one stud 16, 17, 36 on a lower member 29 providing one way to plug the upper 30 and lower 29 members together and ensuring a correct polarity. Additionally and/or alternatively mechanical keys, for example a male mechanical key on the upper member 30 that fits into a corresponding female mechanical key in the lower member 29 may be provided. As another example, the distances 51,52 (as shown in FIG. 13A) between the jacks 10, 11 and the stud 36 may differ from each other to provide an unsymmetrical pattern that fits only one way, thus ensuring correct polarity.

FIG. 13A is a top view of an exemplary connector having a lower non-stackable member 35 with two round jacks 10, 11 and a trapezoidal stud 36 shown with misaligned tips 33, 34 of studs 16, 17 of an upper stackable member 31, in accordance with various embodiments. Referring to FIG. 13A, distances 51, 52 between the studs tips 33, 34 and jacks 10, 11 are shown. Although FIG. 13A illustrates one trapezoidal stud 36, two tips 33, 34 of round studs 16, 17, and two corresponding jacks 10, 11, any number of studs and corresponding jacks may be used to form the connection. Furthermore, any combination of jacks and studs in a member corresponding to any combination studs and jacks in the corresponding member may be used.

FIG. 13B is a side section view of an exemplary connector having an upper stackable member 31 with jack 32 and stud 16 not plugged into a lower non-stackable member 35 with jack 10 and stud 36, in accordance with various embodiments. The body, deformable bar, and cable of the upper stackable member 31 are not shown. In various embodiments, the stud 16 of the upper stackable member 31 and the jack 10 of the lower non-stackable member 35 may be round or any suitable shape. The jack 32 of the upper stackable member 31 and the stud 36 of the lower non-stackable member 35 may be trapezoidal or any suitable shape. In a representative embodiment, the axes of the stud 16 and jack 10 may form an angle 37 that may be reduced as the upper member 31 and lower member 35 are connected.

FIG. 14 is a front section view of an exemplary connector having an upper stackable member 31 with two deformable bars 41, three jacks 19, 20, 32, and two studs 16, 17 fully plugged into a lower non-stackable member 35 with two jacks 10, 11 and one stud 36, in accordance with various embodiments. The cable of the upper stackable member 31 is not shown. Referring to FIG. 14, the studs 16, 17 of the upper stackable member 31 may be round and jack 32 may be trapezoidal. The two studs 16, 17, three jacks 19, 20, 32, and two deformable bars 41 may be arranged inside the body 18 of the upper member 31. The upper stackable member 31 is fully plugged into a lower non-stackable member 35 with two jacks 10, 11 and a trapezoidal stud 36 that fits into the trapezoidal jack 32. The two deformable bars 41 may be arranged to create torsion forces between the studs 16, 17 and the jack 32, when the upper member 31 is forced into the lower member 35 with the corresponding jacks 10, 11 and trapezoidal stud 36. In other words, the insertion of the studs 16, 17, 36 into jacks 10, 11, 32 creates torsion forces and deformation in the deformable bars 41 that create contact forces between the studs and the jacks that may be used as electrical contact for electrical signals between the members. The trapezoidal shape of the jack 32 and stud 36 ensures a correct polarity of the plug when plugged together. Other shapes than trapezoidal, such as a non-symmetric triangle, round with notches, and/or any suitable shape that provides correct polarity may be used.

FIG. 15A is a top view of an exemplary connector having a lower non-stackable member 35 with two round jacks 10, 11 and a trapezoidal stud 36 shown with misaligned tips 33, 34 of studs 16, 17 of an upper stackable member 31 inserted therein, in accordance with various embodiments.

FIG. 15B is a side section view of an exemplary connector having an upper stackable member 31 with jack 32 and stud 16 fully plugged into a lower non-stackable member 35 with jack 10 and stud 36, in accordance with various embodiments. The body, deformable bar, and cable of the upper stackable member 31 are not shown. Referring to FIG. 15B, an angle 37 between the axes of the stud 16 and jack 10 may be reduced (from FIG. 13B, for example) by virtue of torsion forces and the resultant deformation. The deformation forces create contact forces that may be utilized as electrical contact.

Figure 16A:
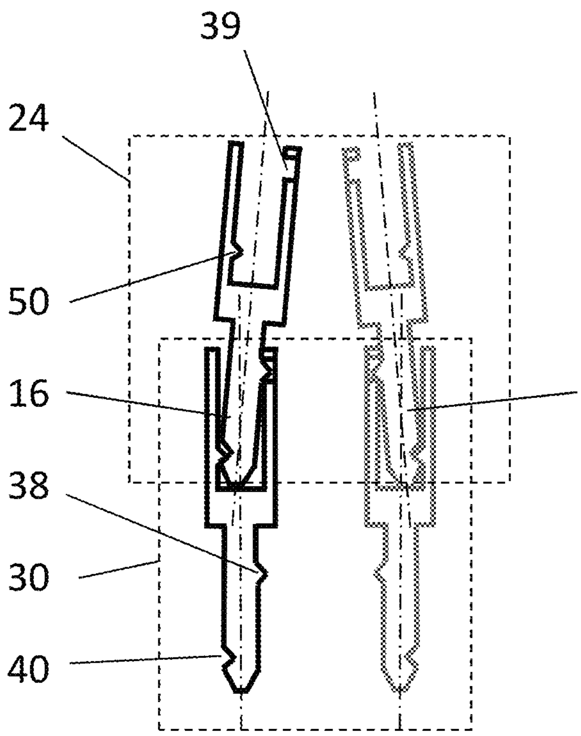
FIG. 16A and FIG. 16B are front section views of an exemplary upper member plugged into an exemplary lower member providing widening and narrowing features to provide additional mechanical holding forces when plugged in so that the narrowing and/or widening features substantially fit into each other, in accordance with various embodiments.
Figure 16B:
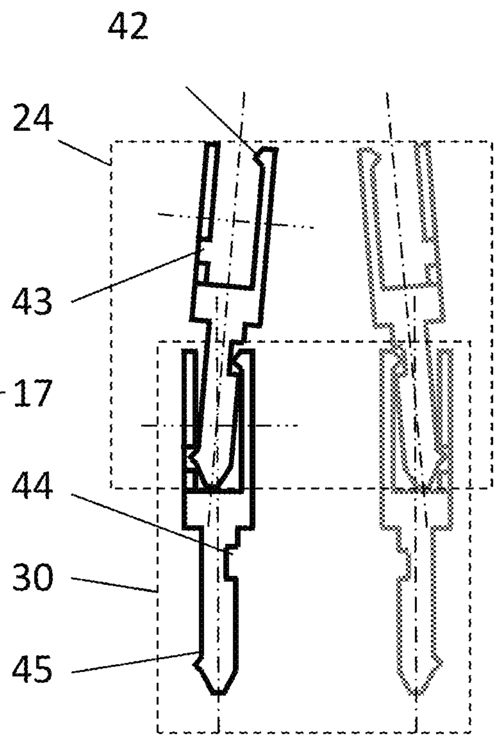

FIG. 16A and FIG. 16B are front section views of an exemplary upper member 24 plugged into an exemplary lower member 30 providing widening 38, 39, 43, 45 and narrowing 40, 42, 44, 50 features to provide additional mechanical holding forces when plugged in so that the narrowing 40, 42, 44, 50 and/or widening 38, 39, 43, 45 features substantially fit into each other, in accordance with various embodiments. Referring to FIG. 16A, a cylinder contact area of the studs 16, 17 may include a widening feature 38 that substantially fits into a corresponding widening feature 39 in the jacks 10, 11 to increase the holding force of the upper stackable connector 24 relative to a lower stackable connector 30 or a jack 10, 11, 32, once the connector is plugged together to the depth that the features may substantially fit into each other. In various embodiments, the tip region may include a narrowing feature 40 that substantially fits into a corresponding narrowing feature 50 in the jacks to increase the holding force of the upper stackable connector 24 relative to a lower stackable connector 30 or a jack 10, 11, 32, once the connector is plugged together to the depth that the features may substantially fit into each other. In various embodiments the features 38, 39, 40, 50 may all be present. The additional holding force from narrowing 40, 50 or widening 38, 39 features may prevent inadvertent removal of the connector, for example, by a user bumping it. Furthermore, when the features 38, 39, 40, 50 substantially fit into each other a tactile feedback is provided to the user that a certain plug depth is achieved.

Referring to FIG. 16B, a cylinder contact area of the studs 16, 17 may include a narrowing feature 44 that substantially fits into a corresponding narrowing feature 42 in the jacks to increase the holding force of the upper stackable connector 24 relative to a lower stackable connector 30 or a jack 10, 11, 32, once the connector is plugged together to the depth that the features may substantially fit into each other. In various embodiments, the tip region may include a widening feature 45 that substantially fits into a corresponding widening feature 43 in the jacks to increase the holding force of the upper stackable connector 24 relative to a lower stackable connector 30 or a jack 10, 11, 32, once the connector is plugged together to the depth that the features may substantially fit into each other. In various embodiments, the features 42, 43, 44, 45 may all be present. The additional holding force from narrowing 42, 44 or widening 43, 45 features may prevent inadvertent removal of the connector, for example, by a user bumping it. Furthermore, when the features 42, 43, 44, 45 substantially fit into each other a tactile feedback is provided to the user that a certain plug depth is achieved.

Figure 17:
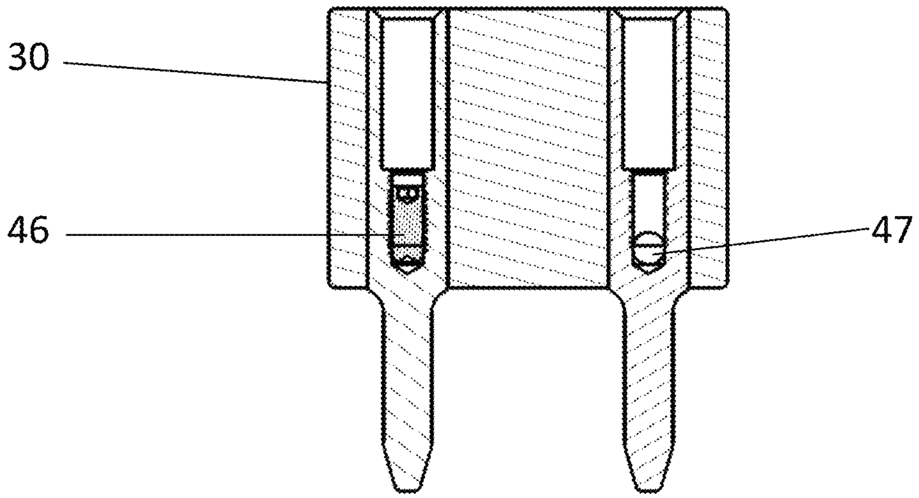
FIG. 17 is a front section view of an exemplary connector having openings and a set screw to fasten cables to the connector, in accordance with various embodiments.

FIG. 17 is a front section view of an exemplary connector 30 having openings 47 and a set screw 46 to fasten cables to the connector 30, in accordance with various embodiments. Referring to FIG. 17, the stackable connector 30 comprises at least one opening 47 and at least one set screw 46 or the like to affix at least one wire to the connector. At least one wire may be inserted through an opening 47 and affixed with a set screw 46 or the like to provide a stable connection between the at least one wire and the connector 30.

Figure 18A:
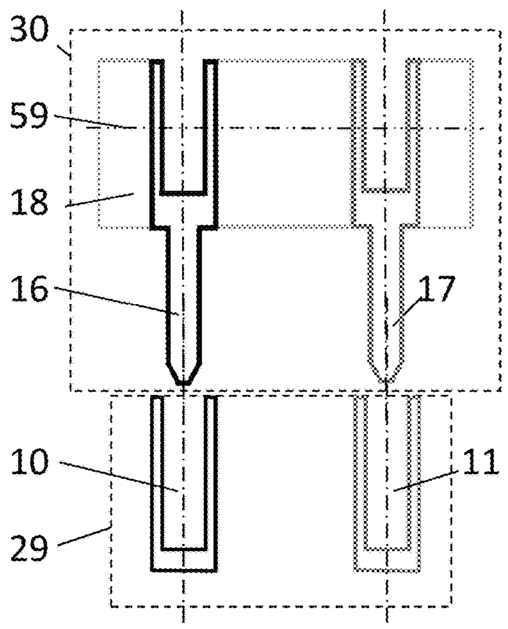
FIG. 18A is a front section view of an exemplary connector having an upper stackable member with two studs unplugged from a lower non-stackable member with two jacks, in accordance with various embodiments.

FIG. 18A is a front section view of an exemplary connector having an upper stackable member 30 with two studs 16, 17 unplugged from a lower non-stackable member 29 with two jacks 10,11, in accordance with various embodiments. The cable of the upper stackable member 30 is not shown. Referring to FIG. 18A, the upper stackable member 30 includes a body having an axis 50. The two studs 16, 17 may be angled relative to the corresponding jacks 10, 11 such that the axes 13, 14 of the studs 16, 17 are out of the plane of the jack axes and the axis 59 of the body 18. The body may be configured to substantially deform by torsion through angular misalignment. The body 18 may be substantially rigid and can transfer torsion forces between studs 16, 17.

Figure 18B:
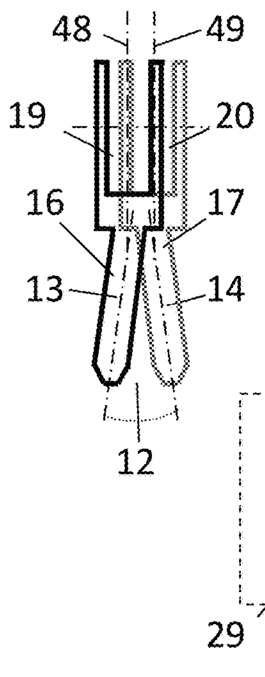
FIG. 18B is a side section view of an exemplary connector having an upper stackable member with two studs each having an axis forming an angle, in accordance with various embodiments.

FIG. 18B is a side section view of an exemplary connector having an upper stackable member 30 with two studs 16, 17 each having an axis 13, 14 forming an angle 12, in accordance with various embodiments. The body and cable of the upper stackable member 30 are not shown. Referring to FIG. 18B, the upper stackable member 30 includes jacks 19, 20 corresponding to the studs 16, 17. The jacks 19, 20 include axes 48, 49 that are substantially parallel. Unless so claimed, the direction of the angle may be any suitable direction.

Figure 18C:
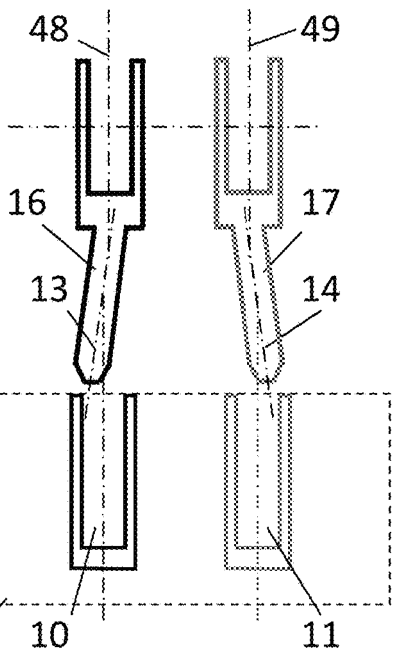
FIG. 18C is an angled section view of an exemplary connector having an upper stackable member with two studs unplugged from a lower stackable member with two jacks, in accordance with various embodiments.

FIG. 18C is an angled section view of an exemplary connector having an upper stackable member 30 with two studs 16, 17 unplugged from a lower stackable member 29 with two jacks 10, 11, in accordance with various embodiments. The rigid body and cable of the upper stackable member 30 are not shown. Referring to FIG. 18C, the studs 16, 17 include axes 13, 14 that are angled.

Figure 19A:
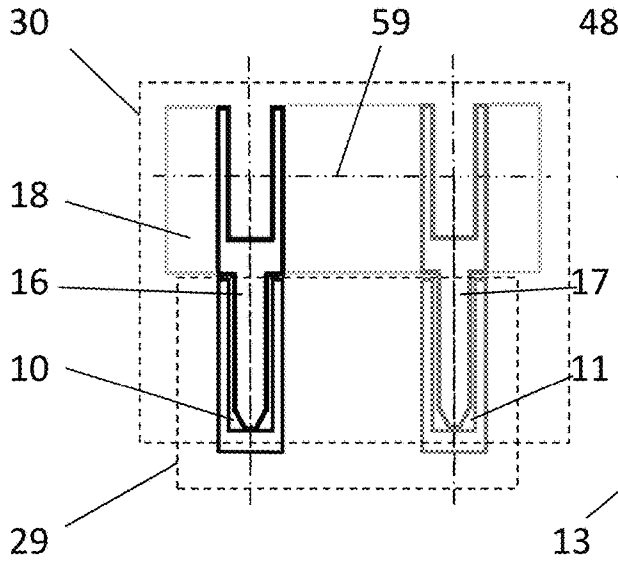
FIG. 19A is a front section view of an exemplary connector having an upper stackable member with two studs fully plugged into two jacks of a lower non-stackable member, in accordance with various embodiments.

FIG. 19A is a front section view of an exemplary connector having an upper stackable member 30 with two studs 16, 17 fully plugged into two jacks 10, 11 of a lower non-stackable member 29, in accordance with various embodiments. The cable of the upper stackable member 30 is not shown. Referring to FIG. 19A, the upper stackable member 30 includes a body 18 and two angled studs 16, 17 plugged completely into a lower non-stackable member 29 with two jacks 10, 11. The angle of the studs 16, 17 relative the corresponding jacks 10, 11 is such that the axes 13, 14 of the studs 16, 17 are out of the plane of the jack axes and the axis 59 of the body 18. The body 18 is substantially rigid and can transform torsion forces between studs 16, 17.

Figure 19B:
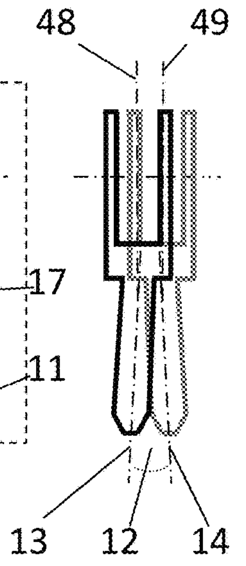
FIG. 19B is a side section view of an exemplary connector having an upper stackable member with two studs each having an axis forming an angle, in accordance with various embodiments.

FIG. 19B is a side section view of an exemplary connector having an upper stackable member 30 with two studs 16, 17 each having an axis 13, 14 forming an angle 12, in accordance with various embodiments. The body and cable of the upper stackable member 30 are not shown. Referring to FIG. 19B, the upper stackable member 30 includes jacks 19, 20 corresponding to the studs 16, 17. The jacks 19, 20 include axes 48, 49 that are substantially parallel. The angle 12 between the axes 13, 14 may change, thereby creating torsion forces in the body 18 of the upper member 30, when the upper connector 30 is plugged into the lower non-stackable member 29 such that the studs 16, 17 are bent.

Figure 19C:
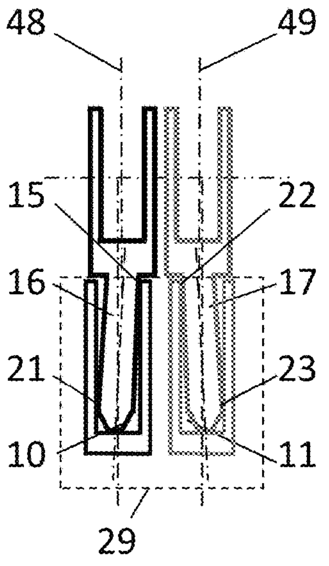
FIG. 19C is an angled section view of an exemplary connector having an upper stackable member with two studs fully plugged into two jacks of a lower stackable member, in accordance with various embodiments.

FIG. 19C is an angled section view of an exemplary connector having an upper stackable member 30 with two studs 16, 17 fully plugged into two jacks 10, 11 of a lower stackable member 29, in accordance with various embodiments. The rigid body and cable of the upper stackable member 30 are not shown. Referring to FIG. 19C, the studs 16, 17 include axes 13, 14 that are angled. The angle 12 between the axes 13, 14 of the studs 16, 17 change, from the angle shown in FIG. 18C for example, through the forces created at the contact points 15, 21, 22, 23 when plugged into the two jacks 10, 11 of the lower non-stackable member 29. The axes 48, 49 of the corresponding jacks 19, 20 may remain substantially parallel while the studs 16, 17 are inserted in jacks 10, 11 by virtue of the substantially rigid connector body 18. In other words, the contact points 15, 21 between jack 10 and stud 16 create a bending force in stud 16 that is transferred through a torsion force in the substantially rigid body 18 of the connector to stud 17. Furthermore, the contact points 22, 23 create the contact forces that bend stud 17 and that flow through jack 11 into the lower non-stackable member 29 and back to jack 10 for equilibrium of the forces. The contact forces 15, 21, 22, 23 are used for electrical contact, which in turn is used for the transmission of electrical signals between the members 30, 29.

Figure 20:
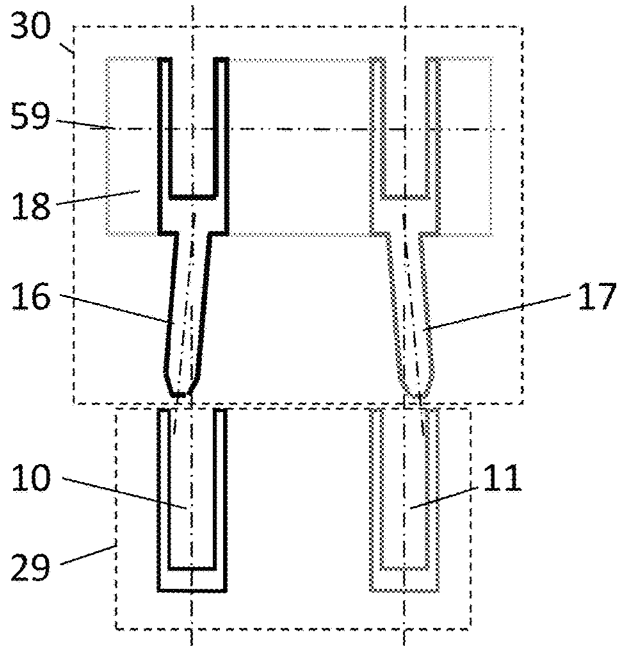
FIG. 20 is a front section view of an exemplary connector having an upper stackable member with rigid body and two angled studs that are misaligned with, and unplugged from, jacks of a lower non-stackable member, in accordance with various embodiments.

FIG. 20 is a front section view of an exemplary connector having an upper stackable member 30 with rigid body 18 and two angled studs 16, 17 that are misaligned with and unplugged from jacks 10, 11 of a lower non-stackable member 29, in accordance with various embodiments. The cable of the upper stackable member 30 is not shown. Referring to FIG. 20, the angle of the studs and the axis 59 of the body 18 is in one plane. The body 18 is substantially rigid and can transfer bending forces between studs 16, 17.

Figure 21A:
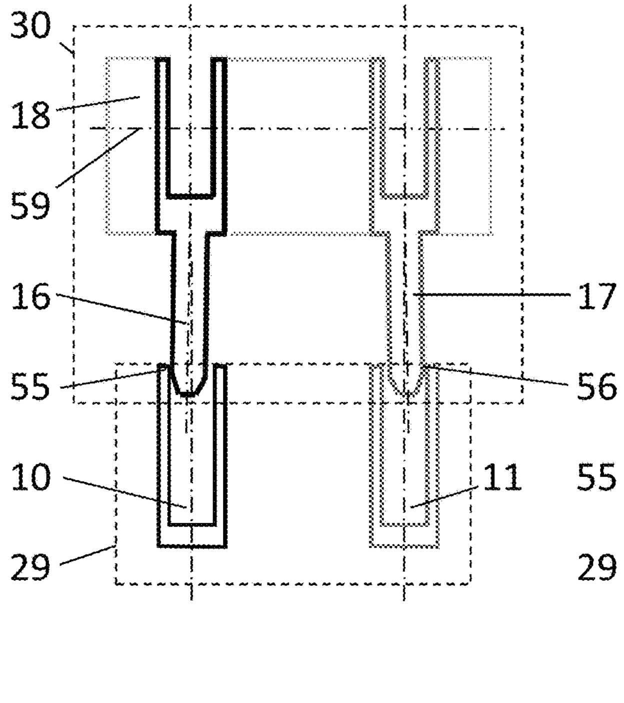
FIG. 21A is a front section view of an exemplary connector having an upper stackable member with rigid body and two angled studs that are partially plugged into jacks of a lower non-stackable member, in accordance with various embodiments.

FIG. 21A is a front section view of an exemplary connector having an upper stackable member 30 with rigid body 18 and two angled studs 16, 17 that are partially plugged into jacks 10, 11 of a lower non-stackable member 29, in accordance with various embodiments. The cable of the upper stackable member 30 is not shown. Referring to FIG. 21A, the angle of the studs 16, 17 and the axis 59 of the body 18 is in one plane. The studs 16, 17 have been substantially deformed during the plug in process and form contact points 55, 56 with the walls of the jacks 10, 11. The body 18 is substantially rigid and can transfer bending forces of one stud 16 to the other stud 17.

Figure 21B:
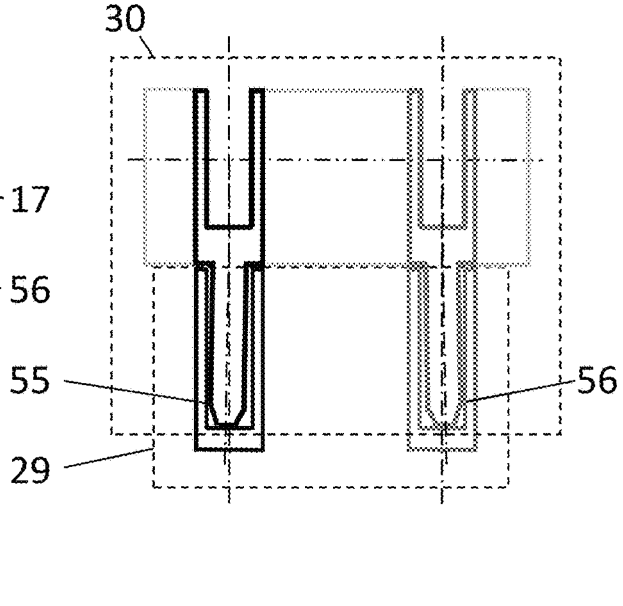
FIG. 21B is a front section view of an exemplary connector having an upper stackable member with rigid body and two angled studs fully plugged into jacks of a lower non-stackable member, in accordance with various embodiments.

FIG. 21B is a front section view of an exemplary connector having an upper stackable member 30 with rigid body 18 and two angled studs 16, 17 fully plugged into jacks 10, 11 of a lower non-stackable member 29, in accordance with various embodiments. The cable of the upper stackable member 30 is not shown. Referring to FIG. 21B, the angle of the studs and the axis 59 of the body is in one plane. The studs 16, 17 have been substantially deformed during the plug in process and form contact points 55, 56 with the walls of the jacks 10, 11. The contact points may be used for electrical contact between the members 29, 30.

Aspects of the present disclosure provide an electrical connector system having deformable electrical connectors comprising studs 16, 17, 36 and jacks 10, 11, 32 that can be deformed during the plug in process due to angular and/or axial misalignment. The studs 16, 17, 36 are intentionally misaligned at angles 12, 37, 60 and/or provided with axial misalignments 53, 54 with respective jacks 10, 11, 32. The intentionally misaligned studs 16, 17 and jacks 10, 11 eliminate the need for conventional spring members for providing resultant forces between the studs 16, 17, 36 and the jacks 10, 11, 32 and the need for studs and jacks to have non-constant widths as described in the prior art. Instead, the misalignment causes the plug body 18, the optional deformable bar 41, the studs 16, 17, 36, the jacks 10, 11, 32, and/or the lower member 29 to deform through forces at the contact points 15, 21, 22, 23, 55, 56, 57, 58 thus reducing the angles 12, 37, 60. More specifically, studs 16, 17, 36, and jacks 10, 11, 32 may be integrated into an upper stackable connector member 30 and a lower connector member 29, respectively. The misalignment of the studs 16, 17, 36, and jacks 10, 11, 32 of the upper 30 and lower 29 connector members creates deformation in the overall connector 29, 30 once plugged in, thereby creating resultant forces that press the studs 16, 17, 36, at contact points 15, 21, 22, 23, 55, 56, 57, 58 against the walls of the jacks 10, 11, 32. The resultant forces create electrical contact between the studs 16, 17, 36, and jacks 10, 11, 32. The forces keep the contact over initial mechanical tolerances and abrasion tolerances over time. The resultant forces further withstand mechanical forces on the member 30, such as a user bumping the member 30. In various embodiments, the studs 16, 17, 36, and jacks 10, 11, 32 may be solid metal parts allowing manufacture from corrosion resistant materials such as titanium, high performance alloys from the Hastelloy Cr group, alloys from the austenitic nickel-chromium based superalloys such as Inconel 625, and other suitable corrosion resistant materials.

To overcome the angles 12, 37, 60 and/or axial misalignments 53, 54 of the axes 13, 14 of the studs 16, 17, 36, cone-shaped stud tips 33, 34 slidably guide the studs 16, 17, 36, into the jacks 10, 11, 32 while deforming at least one of the plug body 18, the optional deformable bar 41, the studs 16, 17, 36, the jacks 10, 11, 32, and/or lower member 29 body. As the studs 16, 17, 36, are slid into jacks 10, 11, 32, angles 12, 37, 60 between the stud axes 13, 14 change.

In various embodiments, the profile of the stud 16, 17, 36, may be shaped similar to a cylinder with a cone at the tip. The tip and upper part of the cylinder of the stud 16, 17, 36 touch the inside of the jack 10, 11, 32 at the contact points 15, 21, 22, 23, 55, 56, 57, 58. The contact area 21 can have several geometries, such as, for example, a curve between the cone and the cylinder, a sphere, rounded, sharp, or an additional cone (e.g., the stud wall parallel with the jack walls when plugged in and thus deformed). The contact area may be thicker than the bases of the cones to counteract abrasion over long periods of time.

In various embodiments, the cylinder area of the studs 16, 17 may include a widening feature 38 that substantially fits into a corresponding widening feature 39 in the jacks to increase the holding force of the upper stackable connector 24 relative to a lower stackable connector 30 or a jack 10, 11, 32 once the connector is plugged together to the depth that the features may substantially fit into each other. In various embodiments, the tip region may include a narrowing feature 40 that substantially fits into a corresponding narrowing feature 42 in the jacks to increase the holding force of the upper stackable connector 24 relative to a lower stackable connector 30 or a jack 10, 11, 32 once the connector is plugged together to the depth that the features may substantially fit into each other. In various embodiments, the features 38, 39 and 40, 42 may all be present. The additional holding force from narrowing or widening features may protect against inadvertent removal of the connector, for example, by a user bumping it. Furthermore, when the features substantially fit into each other a tactile feedback is provided to the user that a certain plug depth is achieved.

In various embodiments, the cylinder area of the studs 16, 17 may include a narrowing feature 44 that substantially fits into a corresponding narrowing feature 42 in the jacks to increase the holding force of the upper stackable connector 24 relative to a lower stackable connector 30 or a jack 10, 11, 32 once the connector is plugged together to the depth that the features may substantially fit into each other. In various embodiments, the tip region may include a widening feature 45 that substantially fits into a corresponding widening feature 43 in the jacks to increase the holding force of the upper stackable connector 24 relative to a lower stackable connector 30 or a jack 10, 11, 32 once the connector is plugged together to the depth that the features may substantially fit into each other. In various embodiments, the features 42, 43 and 44, 45 may all be present. In various embodiments, the widening feature 45 may be omitted and the function of the increase of the holding force may be performed by the tip regions 33, 34 themselves when substantially fitting into the widening feature 43 in the jacks. The additional holding force from narrowing or widening features may prevent inadvertent removal of the connector, for example, by a user bumping it. Furthermore, when the features substantially fit into each other a tactile feedback is provided to the user that a certain plug depth is achieved.

In various embodiments, one or more of the studs 16, 17, 36 may not be electrically conducting. For example, some of the studs 16, 17, 36 of a connector can be part of an electrical connection and some can just provide a counter bearing to create the desired resultant deformation forces for the electrical connections in the corresponding jacks 10, 11, 32.

In various embodiments, the upper 30 and lower 29 members may each comprise a body 18 for jacks 10, 11, 32 and studs 16, 17, 36. The body 18 may be plastic or any suitable material for allowing deformation to provide the resultant torsion forces of the studs 16, 17, 36 against the jacks 10, 11, 32. For example, the softer the body material, the lower the resultant torsion forces. Consequently, a ratio between the softness of the body material and the value of the angles 12, 37, 60 may be balanced to obtain the desired resultant deformation forces. The body may include a deformable bar 41 to add substantial resulting forces of the studs 16, 17, 36 against the jacks 10, 11, 32. Consequently, a ratio between the softness of the body material and the deformable bar 41 and the value of the angling may be balanced to obtain the desired resultant forces.

In other embodiments, the body 18 may be substantially rigid. The deformation forces of the studs 16, 17, 36, arranged with angles 12, 37, 60 when plugged into the lower member 29 on the contact points 15, 21, 22, 23, 55, 56, 57, 58 create the contact forces in the jacks 10, 11, 32, that may be used for electrical contact.

The overall plug pattern geometry may also contribute to ensuring that sufficient resultant torsion forces are provided. For example, an eight stud upper connector can be arranged in a circle, each adjacent stud angled to the next stud, to create similar resultant deformation forces for each stud when plugged into the corresponding jacks of the lower member.

Various embodiments provide that studs 16, 17, 36 and/or jacks 10, 11, 32 can be slotted to create prongs that provide a spring effect that adds to a resultant force for each stud 16, 17, 36. For example, a diameter of a stud 16, 17, 36 may be larger than the corresponding opening diameter of a jack 10, 11, 32. The cones at the tips 33, 34 of a stud 16, 17, 36 that has been slotted to form prongs may be compressed during insertion of the pronged studs 16, 17, 36 into the jacks 10, 11, 32. The spring effect of the compressed prongs creates a resultant force for the electrical contact. As another example, the cones at the tips 33, 34 of studs having a diameter that is larger than the corresponding opening diameter of a slotted jack may force prongs of the slotted jack to expand during stud insertion, which provides a resultant force for the electrical contact. The slotting of the studs 16, 17, 36 and/or jacks 10, 11, 32 may be used in addition to and/or as an alternative to angling the studs 16, 17, 36 and jacks 10, 11, 32.

In accordance with various embodiments, an electrical connector system is provided. The system may comprise an upper stackable member 30 and a lower non-stackable member 29. The upper member 30 may comprise an upper member body 18 holding upper connections comprising at least one of a plurality of studs 16, 17, 36 and a plurality of jacks 10, 11, 32. The lower non-stackable member 29 comprising a lower member body holding lower connections comprising at least one of the plurality of studs 16, 17, 36 and the plurality of jacks 10, 11, 32 that are opposite and correspond with the upper connections. The upper connections have axes 13, 14 that have angles 12, 37, 60 in an unplugged state. The angling creates deformation, as shown in FIGS. 6A, 6B, 6C, 7A, 7B, 7C, 9A, 9B, 9C, 9D, 19A, 19B, 19C, 21A, and 21B, of at least one of the upper member 30 and the lower member 29 when the upper connections and the lower connections are plugged together. The deformation creates resultant forces between the upper connections and the lower connections that may be used as contact forces.

In accordance with various embodiments, an electrical connector system is provided. The system may comprise an upper stackable member 30 and a lower non-stackable member 29. The upper member 30 may comprise an upper member body 18 holding upper connections comprising at least one of a plurality of studs 16, 17, 36 and a plurality of jacks 10, 11, 32. The lower non-stackable member 29 comprising a lower member body holding lower connections comprising at least one of the plurality of studs 16, 17, 36 and the plurality of jacks 10, 11, 32 that are opposite and correspond with the upper connections. The upper connections have axes 13, 14 that are axially misaligned with distances 53, 54 in an unplugged state. The axial misalignment creates deformation, as shown in FIGS. 8A, 8B, 8C and 8D, of at least one of the upper member 30 and the lower member 29 when the upper connections and the lower connections are plugged together. The deformation creates resultant forces between the upper connections and the lower connections that may be used as contact forces.

In accordance with various embodiments, an electrical connector system is provided. The system may comprise an upper stackable connector 24 and a lower stackable connector 30. The upper connector 24 may comprise an upper connector body 18 holding upper connections comprising at least one of a plurality of studs 16, 17, 36 and a plurality of jacks 10, 11, 32. The lower stackable connector 30 comprising a lower connector body holding lower connections comprising at least one of the plurality of studs 16, 17, 36 and the plurality of jacks 10, 11, 32 that are opposite and correspond with the upper connections. The upper connections and the lower connections have axes 13, 14 that have angles 12, 37, 60 in an unplugged state. The angling creates deformation, as shown in FIG. 10, for example, of at least one of the upper connector 24 and/or the lower connector 30 when the upper connections and the lower connections are plugged together. The deformation creates resultant forces between the upper connections and the lower connections.

In accordance with various embodiments, an electrical connector system is provided. The system may comprise an upper stackable connector 24 and a lower stackable connector 30. The upper connector 24 may comprise an upper connector body 18 holding upper connections comprising at least one of a plurality of studs 16, 17, 36 and a plurality of jacks 10, 11, 32. The lower stackable connector 30 comprising a lower connector body holding lower connections comprising at least one of the plurality of studs 16, 17, 36 and the plurality of jacks 10, 11, 32 that are opposite and correspond with the upper connections. The upper connections and the lower connections have axes 13, 14 that are axially misaligned with distances 53, 54 in an unplugged state. The axial misalignment creates deformation of at least one of the upper connector 24 and/or the lower connector 30 when the upper connections and the lower connections are plugged together. The deformation creates resultant forces between the upper connections and the lower connections.

In accordance with various embodiments, an electrical connector system is provided. The system may comprise a multitude of stackable connectors that are plugged into each other and may be plugged in a non-stackable member. As illustrated in FIG. 10, with two exemplary stackable connectors 24, 30 with two studs and two jacks and a lower non-stackable connector 29; the lowest connector 29 is not. The deformations provide mechanical contact forces between the corresponding studs and jacks, which in turn provide electrical contact between the corresponding studs and jacks. If these assemblies be plugged into a non-deformable jack assembly 29 or another stackable plug 30 the lowest connector would be deformed while still providing deforming forces and thereby contact forces that may be used for electrical contact to the middle connector. In that way, a long series of stacked connectors can be created if so desired.

In a representative embodiment, a stud profile of at least one of the plurality of studs 16, 17, 36 comprises a width that increases from the tips 33, 34 to the central cylindrical regions, as shown in FIG. 12. A jack profile of at least one of the plurality of jacks 10, 11, 32 that corresponds with the at least one of the plurality of studs 16, 17, 36 comprises the walls being parallel such that the width of the hole between the opening and the end is constant.

In various embodiments, the studs 10, 11, 32 and the jacks 16, 17, 36 comprise corrosion resistant materials comprising at least one of titanium, high performance alloys from the Hastelloy-Cr group, and austenitic nickel-chromium based alloys.

In certain embodiments, at least one of the plurality of studs 16, 17, 36 is slotted to create prongs. The prongs may be compressed during insertion into at least one of the plurality of jacks 10, 11, 32 that corresponds with the at least one of the plurality of studs 16, 17, 36. In a representative embodiment, at least one of the plurality of jacks 10, 11, 32 is slotted to create prongs. The prongs may be pushed apart during insertion of at least one of the plurality of studs 16, 17, 36 that corresponds with the at least one of the plurality of jacks 10, 11, 32.

In a representative embodiment, the upper connections and the lower connections are arranged to provide a correct polarity when the upper connections and the lower connections are plugged together. In various embodiments, the diameter of a first portion of the plurality of jacks 10, 11, 32 is different than the diameter of the second portion of the plurality of jacks 10, 11, 32. A first portion of the plurality of studs 16, 17, 36 is sized to correspond with the first portion of the plurality of jacks 10, 11, 32 and a second portion of the plurality of studs 16, 17, 36 is sized to correspond with the second portion of the plurality of jacks 10, 11, 32 such that a correct polarity is provided when the upper connections and the lower connections are plugged together.

In a representative embodiment, the upper connections and the lower connections are arranged to provide a correct polarity when the upper connections and the lower connections are plugged together. In various embodiments, a stud 36 has a profile, for example trapezoidal, which allows for only one direction to be plugged into a jack 32 such that a correct polarity is provided when the upper connections and the lower connections are plugged together. Furthermore, any shape of the stud/plug combination that provides for a correct polarity such as trapezoidal, an unsymmetrical triangle, round with notch, or the like may be provided, as described with respect to FIGS. 12 to 15.

In certain embodiments, the upper member comprises at least one upper mechanical key and the lower member comprises at least one lower mechanical key. The at least one upper mechanical key and the at least one lower mechanical key are operable to mate when the upper connections and the lower connections are plugged together such that correct polarity is provided. In a representative embodiment, the deformation is substantially the same for the upper member and the lower member during a path of the plurality of studs 16, 17, 36 plugging into the plurality of jacks 10, 11, 32. In a representative embodiment, the deformation is substantially not the same for the upper member and the lower member during a path of the plurality of studs 16, 17, 36 plugging into the plurality of jacks 10, 11, 32.

In accordance with various embodiments, an electrical connector system is provided. The system may comprise connectors 30 with at least one opening 47 and a set screw 46 or like to affix at least one wire to the connector. At least one wire may be inserted through an opening 47 and affixed with a set screw 46 or the like to provide a stable connection between the at least one wire and the connector.

In accordance with various embodiments, an electrical connector system is provided. The system may comprise an upper stackable connector 24 and a lower stackable connector 30 and/or non-stackable connector 29. The upper connector 24 may comprise at least one of a plurality of studs 16, 17, 36 and a plurality of jacks 10, 11, 32. The lower stackable connector 30 or non-stackable connector 29 may comprise at least one of the plurality of studs 16, 17, 36 and the plurality of jacks 10, 11, 32 that are opposite and correspond with the upper connections.

In accordance with various embodiments, an electrical connector system is provided. The system may comprise at least one upper stackable connector 24 with at least one of a plurality of studs 16, 17, 36 and at least one of a plurality of jacks 10, 11, 32 and at least one lower stackable connector 30 with at least one of a plurality of studs 16, 17, 36 and at least one of a plurality of jacks 10, 11, 32.

In accordance with various embodiments, an electrical connector system is provided. The system may comprise a widening feature 38 at the cylindrical central region of the studs 16, 17 that fits into a corresponding widening feature 39 in the jacks to increase the holding force of the upper connector 24 relative to the lower connector 30 at the depth of the features when the features fit into each other.

In various embodiments, a narrowing feature 40 at the tip region 33, 34 of the studs 16, 17 may be included that substantially fits into a corresponding narrowing feature 50 in the jacks to increase the holding force of the upper connector 24 relative to the lower connector 30 at the depth of the features when the features substantially fit into each other.

In various embodiments, a narrowing feature 44 at the cylindrical central region of the studs may be included that fits into a corresponding narrowing feature 42 in the jacks to increase the holding force of the upper connector 24 relative to the lower connector 30 at the depth of the features when the features fit into each other.

In various embodiments, a widening feature 45 at the tip region 33, 34 of the studs may be included that substantially fits into a corresponding widening feature 43 in the jacks to increase the holding force of the upper connector 24 relative to the lower connector 30 at the depth of the features when the features substantially fit into each other. In various embodiments, the widening feature 45 may be omitted and the function of the increase of the holding force may be performed by the tip region 33, 34 alone substantially fitting into a widening feature 43 in the jacks.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An electrical connector system comprising:

an upper member comprising an upper member body holding upper connections comprising at least one of a plurality of studs and a plurality of jacks; and a lower member comprising a lower member body holding lower connections comprising at least one of the plurality of studs and the plurality of jacks that are opposite and correspond with the upper connections;

the upper connections and the lower connections having axes that are angularly misaligned:

in an unplugged state, during insertion of the plurality of studs into the plurality of jacks, and in a fully plugged together state, wherein an amount of angular misalignment progressively decreases from the unplugged state to the fully plugged together state during insertion of the plurality of studs into the plurality of jacks, the angular misalignment creating deformation of at least one of the upper member and the lower member when the upper connections contact the lower connections during insertion of the plurality of studs into the plurality of jacks, and the deformation creating a resultant force between the upper connections and the lower connections.

2. The electrical connector system according to claim 1, wherein a jack profile of at least one of the plurality of jacks that corresponds with the at least one of the plurality of studs comprises walls being parallel such that the diameter of a hole between the opening and the end is constant.

3. The electrical connector system according to claim 1, wherein a stud profile of at least one of the plurality of studs that corresponds with the at least one of the plurality of jacks comprises walls being parallel.

4. The electrical connector system according to claim 1, wherein the lower connections and the upper connections comprise corrosion resistant materials comprising at least one of:

titanium, high performance alloys from the Hastelloy-Cr group, and austenitic nickel-chromium based alloys.

5. The electrical connector system according to claim 1, wherein at least one of the plurality of studs is slotted to create prongs, the prongs being compressed during insertion into at least one of the plurality of jacks that corresponds with the at least one of the plurality of studs.

6. The electrical connector system according to claim 1, wherein at least one of the plurality of jacks is slotted to create prongs, the prongs being pushed apart during insertion of at least one of the plurality of studs that corresponds with the at least one of the plurality of jacks.

7. The electrical connector system according to claim 1, wherein the upper connections and the lower connections are arranged to provide a correct polarity when the upper connections and the lower connections are plugged together.

8. The electrical connector system according to claim 1, wherein:

the diameter of a first portion of the plurality of jacks is different than the diameter of a second portion of the plurality of jacks, and a first portion of the plurality of studs is sized to correspond with the first portion of the plurality of jacks and a second portion of the plurality of studs is sized to correspond with the second portion of the plurality of jacks such that a correct polarity is provided when the upper connections and the lower connections are plugged together.

9. The electrical connector system according to claim 1, wherein:

the at least one jack comprises a shape, and at least one stud is shaped to correspond with the at least one jack such that a correct polarity is provided when the upper connections and the lower connections are plugged together.

10. The electrical connector system according to claim 1, wherein the distances between jacks are not symmetrical such that a correct polarity is provided when the upper connections and the lower connections are plugged together.

11. The electrical connector system according to claim 1, wherein:

the upper member comprises at least one upper mechanical key and the lower member comprises at least one lower mechanical key, and the at least one upper mechanical key and the at least one lower mechanical key are operable to mate when the upper connections and the lower connections are plugged together such that correct polarity is provided.

12. The electrical connector system according to claim 1, wherein the deformation is substantially the same for the upper member and the lower member during a path of the plurality of studs plugging into the plurality of jacks.

13. The electrical connector system according to claim 1, wherein the angular misalignment creates deformation of at least one of the plurality of studs and the plurality of jacks.

14. The electrical connector system according to claim 1, wherein the angular misalignment creates deformation of at least one of the upper member body and the lower member body.

15. The electrical connector system according to claim 1, wherein the plurality of studs each include a substantially constant width and the plurality of jacks each include a substantially constant width.

16. The electrical connector system according to claim 1, wherein one or both of the upper member and the lower member is stackable.

17. The electrical connector system according to claim 1, wherein a first axis of a first one of the plurality of studs remains non-parallel to a second axis of a second one of the plurality of studs:

in an unplugged state, during insertion of the plurality of studs into the plurality of jacks, and in a fully plugged together state.

18. The electrical connector system according to claim 1, wherein the upper member body comprises a deformable bar connecting the upper connections.

19. The electrical connector system according to claim 18, wherein the deformable bar comprises a deformable spring member and an insulating body.

20. The electrical connector system according to claim 1, wherein each one of the plurality of studs contacts a corresponding one of the plurality of jacks at two contact points when the upper connections and the lower connections are fully plugged together.

21. The electrical connector system according to claim 20, wherein a first contact point of the two contact points is at a proximal end of the one of the plurality of studs and the corresponding one of the plurality of jacks, and a second contact point of the two contact points is at a distal end of the one of the plurality of studs and the corresponding one of the plurality of jacks.

22. The electrical connector system according to claim 21, wherein the first contact point of the two contact points is at a first side of the one of the plurality of studs and the corresponding one of the plurality of jacks, and the second contact point of the two contact points is at a second side, opposite the first side, of the one of the plurality of studs and the corresponding one of the plurality of jacks.

23. The electrical connector system according to claim 1, wherein the upper member body holds additional upper connections comprising at least one of the plurality of studs and the plurality of jacks that are opposite with the upper connections.

24. The electrical connector system according to claim 23, wherein the lower member body holds additional lower connections comprising at least one of the plurality of studs and the plurality of jacks that are opposite with the lower connections.

* * * * *